(12) United States Patent
Xu et al.

(10) Patent No.: US 11,775,582 B2
(45) Date of Patent: *Oct. 3, 2023

(54) GENERATING VISUAL DATA STORIES

(71) Applicant: Adobe Inc., San Jose, CA (US)

(72) Inventors: Shenyu Xu, Atlanta, GA (US); Eunyee Koh, San Jose, CA (US); Fan Du, Milpitas, CA (US); Tak Yeon Lee, San Jose, CA (US); Sana Malik Lee, Brea, CA (US); Ryan Rossi, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,561

(22) Filed: Dec. 21, 2022

(65) Prior Publication Data

US 2023/0130778 A1 Apr. 27, 2023

Related U.S. Application Data

(63) Continuation of application No. 17/161,406, filed on Jan. 28, 2021, now Pat. No. 11,562,019.

(51) Int. Cl.
*G06F 16/30* (2019.01)
*G06F 16/738* (2019.01)
(Continued)

(52) U.S. Cl.
CPC .......... *G06F 16/739* (2019.01); *G06F 16/345* (2019.01); *G06F 16/44* (2019.01);
(Continued)

(58) Field of Classification Search
CPC ...... G06F 16/44; G06F 16/345; G06F 16/739; G06F 16/7834; G06F 16/90332;
(Continued)

(56) References Cited

U.S. PATENT DOCUMENTS

2005/0192955 A1* 9/2005 Farrell ............... G06F 16/9024
707/999.005
2014/0372850 A1* 12/2014 Campbell ............... G06F 40/18
715/212
(Continued)

OTHER PUBLICATIONS

Article entitled "Calliope: Automatic Visual Data Story Generation from a Spreadsheet", by Shi et al., dated Oct. 20, 2020 (Year: 2020).*

(Continued)

*Primary Examiner* — Mahesh H Dwivedi
(74) *Attorney, Agent, or Firm* — Keller Preece PLLC

(57) ABSTRACT

This disclosure describes one or more embodiments of systems, non-transitory computer-readable media, and methods that intelligently and automatically analyze input data and generate visual data stories depicting graphical visualizations from data insights determined from the input data. For example, the disclosed systems automatically extract data insights utilizing an in-depth statistical analysis of dataset groups from data-attribute categories within the input data. Based on the data insights, the disclosed systems can automatically generate exportable visual data stories to visualize the data insights, provide textual or audio-based natural language summaries of the data insights, and animate such data insights in videos. In some embodiments, the disclosed systems generate a visual-data-story graph comprising nodes representing visual data stories and edges representing similarities between the visual data stories. Based on the visual-data-story graph, the disclosed systems can select a relevant visual data story to display on a graphical user interface.

20 Claims, 16 Drawing Sheets

(51) Int. Cl.
    G06F 16/901      (2019.01)
    G06F 16/783      (2019.01)
    G06F 16/34       (2019.01)
    G06F 16/9032     (2019.01)
    G06F 16/44       (2019.01)
(52) U.S. Cl.
    CPC ...... *G06F 16/7834* (2019.01); *G06F 16/9024*
              (2019.01); *G06F 16/90332* (2019.01)
(58) Field of Classification Search
    CPC ............. G06F 16/9024; G06F 16/2474; G06F
              16/2477; G06F 16/26; G06F 40/18; G06F
              40/216; G06F 40/284; G06F 40/30; G06F
                    40/56; G06T 11/206; G06T 2200/24
    See application file for complete search history.

(56)                References Cited

U.S. PATENT DOCUMENTS

| 2018/0088753 | A1* | 3/2018  | Viégas | G06F 40/177 |
| 2018/0329987 | A1* | 11/2018 | Tata   | G06N 3/08   |
| 2018/0357276 | A1* | 12/2018 | Ding   | G06F 16/2453 |
| 2020/0174996 | A1* | 6/2020  | True   | G06F 11/3438 |
| 2020/0372077 | A1* | 11/2020 | Religa | G06F 40/18  |
| 2021/0216593 | A1* | 7/2021  | Chen   | G06F 16/9017 |

OTHER PUBLICATIONS

Article entitled "Chart Constellations: Effective Chart Summarization for Collaborative and Multi-User Analyses", by Xu et al., dated 2018 (Year: 2018).*
Article entitled "News Kaleidoscope: Visual Investigation of Coverage Diversity in News Event Reporting", by Mishra et al., dated 2022 (Year: 2022).*
Robert Amar, James Eagan, and John Stasko. 2005. Low-level components of analytic activity in information visualization. In IEEE Symposium on Information Visualization, 2005. INFOVIS 2005. IEEE, 111-117.
Michael Behrisch, Fatih Korkmaz, Lin Shao, and Tobias Schreck. 2014. Feedback-driven interactive exploration of large multidimensional data supported by visual classifier. In 2014 IEEE Conference on Visual Analytics Science and Technology (VAST). IEEE, 43-52.
Chris Bryan, Kwan-Liu Ma, and Jonathan Woodring. 2016. Temporal summary images: An approach to narrative visualization via interactive annotation generation and placement. IEEE transactions on visualization and computer graphics 23, 1 (2016), 511-520.
Stuart K Card, Ben Shneiderman, and Jock D MacKinlay. 1999. Readings in information visualization: using vision to think. (1999).
Joel Chan, Steven Dang, and Steven P Dow. 2016. Comparing different sensemaking approaches for large-scale ideation. In Proceedings of the 2016 CHI conference on human factors in computing systems. 2717-2728.
Siming Chen, Jie Li, Gennady Andrienko, Natalia Andrienko, Yun Wang, Phong H Nguyen, and Cagatay Turkay. 2018. Supporting story synthesis: Bridging the gap between visual analytics and storytelling. IEEE transactions on visualization and computer graphics (2018).
Matthew Conlen and Jeffrey Heer. 2018. Idyll: A markup language for authoring and publishing interactive articles on the web. In Proceedings of the 31st Annual ACM Symposium on User Interface Software and Technology. 977-989.
Zhe Cui, Sriram Karthik Badam, M Adil Yalçin, and Niklas Elmqvist. 2019. Datasite: Proactive visual data exploration with computation of insight-based recommendations. Information Visualization 18, 2 (2019), 251-267.
TuanNhonDangandLelandWilkinson.2014.Scagexplorer:Exploring scatterplotsbytheirscagnostics.
In2014IEEEPacificvisualizationsymposium. IEEE, 73-80.
Çağatay Demiralp, Peter J. Haas, Srinivasan Parthasarathy, and Tejaswini Pedapati. 2017. Foresight: Recommending Visual Insights. Proc. VLDB Endow. 10, 12 (Aug. 2017), 1937-1940. https://doi.org/10.14778/3137765.3137813.
Rui Ding, Shi Han, Yong Xu, Haidong Zhang, and Dongmei Zhang. 2019. Quickinsights: Quick and automatic discovery of insights from multi-dimensional data. In Proceedings of the 2019 International Conference on Management of Data. 317-332.
Pierre Dragicevic. 2016. Fair statistical communication in HCI. In Modern statistical methods for HCI. Springer, 291-330.
Sandra G Hart and Lowell E Staveland. 1988. Development of NASA-TLX (Task Load Index): Results of empirical and theoretical research. In Advances in psychology. vol. 52. Elsevier, 139-183.
Kevin Hu, Diana Orghian, and César Hidalgo. 2018. Dive: Amixed-initiative system supporting integrated data exploration workflows. In Proceedings of the Workshop on Human-In-the-Loop Data Analytics. 1-7.
Jessica Hullman and Nick Diakopoulos. 2011. Visualization rhetoric: Framing effects in narrative visualization. IEEE transactions on visualization and computer graphics 17, 12 (2011), 2231-2240.
Jessica Hullman, Steven Drucker, Nathalie Henry Riche, Bongshin Lee, Danyel Fisher, and Eytan Adar. 2013. A deeper understanding of sequence in narrative visualization. IEEE Transactions on visualization and computer graphics 19, 12 (2013), 2406-2415.
Madelon Hulsebos, Kevin Hu, Michiel Bakker, Emanuel Zgraggen, Arvind Satyanarayan, Tim Kraska, Çagatay Demiralp, and César Hidalgo .2019. Sherlock: A Deep Learning Approach to Semantic Data Type Detection (KDD '19). Association for Computing Machinery, New York, NY, USA, 1500-1508. https://doi.org/10.1145/3292500.3330993.
Sean Kandel, Ravi Parikh, Andreas Paepcke, Joseph M Hellerstein, and Jeffrey Heer. 2012. Profiler: Integrated statistical analysis and visualization for data quality assessment. In Proceedings of the International Working Conference on Advanced Visual Interfaces. 547-554.
Alicia Key, Bill Howe, Daniel Perry, and Cecilia Aragon. 2012. Vizdeck: self-organizing dashboards for visual analytics. In Proceedings of the 2012 ACM SIGMOD International Conference on Management of Data. 681-684.
Po-Ming Law, Rahul C Basole, and Yanhong Wu. 2018. Duet: Helping data analysis novices conduct pairwise comparisons by minimal specification. IEEE transactions on visualization and computer graphics 25, 1 (2018), 427-437.
Po-Ming Law, Subhajit Das, and Rahul C Basole. 2019. Comparing Apples and Oranges: Taxonomy and Design of Pairwise Comparisons within Tabular Data. In Proceedings of the 2019 CHI Conference on Human Factors in Computing Systems. 1-12.
Po-Ming Law, Alex Endert, and John Stasko. 2020. Characterizing automated data insights. arXiv preprint arXiv:2008.13060 (2020).
Bongshin Lee, Nathalie Henry Riche, Petra Isenberg, and Sheelagh Carpendale. 2015. More than telling a story: Transforming data into visually shared stories. IEEE computer graphics and applications 35, 5 (2015), 84-90.
Doris Jung-Lin Lee, Himel Dev, Huizi Hu, Hazem Elmeleegy, and Aditya Parameswaran. 2019. Avoiding drill-down fallacies with VisPilot: assisted exploration of data subsets. In Proceedings of the 24th International Conference on Intelligent User Interfaces. 186-196.
Rensis Likert. 1932. A technique for the measurement of attitudes. Archives of psychology (1932).
Roberto Martinez-Maldonado, Vanessa Echeverria, Gloria Fernandez Nieto, and Simon Buckingham Shum. 2020. From Data to Insights: A Layered Storytelling Approach for Multimodal Learning Analytics. In Proceedings of the 2020 CHI Conference on Human Factors in Computing Systems. 1-15.
S. McKenna, N. Henry Riche, B. Lee, J. Boy, and M. Meyer. 2017. Visual Narrative Flow: Exploring Factors Shaping Data Visualization Story Reading Experiences. Computer Graphics Forum 36, 3 (Jun. 2017), 377-387. https://doi.org/10.1111/cgf.13195.
Zhengjie Miao, Andrew Lee, and Sudeepa Roy. 2019. LensXPlain: visualizing and explaining contributing subsets for aggregate query answers. Proceedings of the VLDB Endowment 12, 12 (2019), 1898-1901.

(56) References Cited

OTHER PUBLICATIONS

Ashley Ohmann and Matt Floyd. 2015. Creating Data Stories with Tableau Public. Packt Publishing Ltd.
Alvitta Ottley, Aleksandm Kaszowska, R. Jordan Crouser, and Evan M. Peck. 2019. The Curious Case of Combining Text and Visualization. EuroVis 2019-ShortPapers (2019) 5 pages, https://doi.org/10.2312/EVS.20191181ArtworkSize:5pagesISBN:9783038680901 Publisher:The Eurographics Association Version No. 121-125.
Peter Pirolli and Stuart Card. 2005. The sense making process and leverage points for analyst technology as identified through cognitive task analysis. In Proceedings of International Conference on Intelligence Analysis.
Adam Rule, Aurélien Tabard, and James D. Hollan. 2018. Exploration and Explanation in Computational Notebooks. In Proceedings of the 2018 CHI Conference on Human Factors in Computing Systems (CHI '18). Association for Computing Machinery, New York, NY, USA, 1-12. https://doi.org/10.1145/3173574.3173606.
Arvind Satyanarayan and Jeffrey Heer. 2014. Authoring narrative visualizations with ellipsis. In Computer Graphics Forum, vol. 33. Wiley Online Library, 361-370.
Edward Segel and Jeffrey Heer. 2010. Narrative visualization. Telling stories with data. IEEE transactions on visualization and computer graphics 16, 6 (2010), 1139-1148.
Jinwook Seo and Ben Shneiderman. 2005. A rank-by-feature framework for interactive exploration of multidimensional data. Information visualization 4, 2 (2005), 96-113.
Tarique Siddiqui, Albert Kim, John Lee, Karrie Karahalios, and Aditya Parameswaran. 2016. Effortless data exploration with zenvisage: an expressive and interactive visual analytics system. arXiv preprint arXiv:1604.03583 (2016).
Arjun Srinivasan, Steven M Drucker, Alex Endert, and John Stasko. 2018. Augmenting visualizations with interactive data facts to facilitate interpretation and communication. IEEE transactions on visualization and computer graphics 25, 1 (2018), 672-681.
Charles D. Stolper, Bongshin Lee, Nathalie Henry Riche, and John Stasko. 2016. Emerging and Recurring Data-Driven Storytelling Techniques: Analysis of a Curated Collection of Recent Stories. Technical Report MSR-TR-2016-14. https://www.microsoft.com/en-us/research/publication/emerging-andrecurring-data-driven-storytelling-techniques-analysis-of-a-cumted-collection-of-recent-stories/.
Q. Wang, Z. Li, S. Fu, W. Cui, and H. Qu. 2019. Narvis: Authoring Narrative Slideshows for Introducing Data Visualization Designs. IEEE Transactions on Visualization and Computer Graphics 25, 1 (2019), 779-788.
Y. Wang, Z. Sun, H. Zhang, W. Cui, K. Xu, X. Ma, and D. Zhang. 2020. DataShot: Automatic Generation of Fact Sheets from Tabular Data. IEEE Transactions on Visualization and Computer Graphics 26, 1 (2020), 895-905.
Graham Wills and Leland Wilkinson 2010. Autovis: automatic visualization. Information Visualization 9, 1 (2010), 47-69.
Qiyu Zhi, Alvitta Ottley, and Ronald Metoyer. 2019. Linking and Layout: Exploring the Integration of Text and Visualization in Storytelling. Computer Graphics Forum 38, 3 (2019), 675-685. https://doi.org/10.1111/cgf.13719 _eprint: https://onlinelibrary.wiley.com/doi/pdf/10.1111/cgf.13719.
2019: The Year in Visual Stories and Graphics by the New York Times dated Nov. 2, 2020; https://www.nytimes.com/interactive/2019/12/30/us/2019-year-in-graphics.html.
Jupyter; Project Jupyter exists to develop open-source software, open-standards, and services for interactive computing across dozens of programming languages. Date downloaded Mar. 25, 2021; https://jupyter.org.
tsfresh; "tsfresh is a python package." Date downloaded Mar. 25, 2021; https://tsfresh.readthedocs.io/en/latest/.
Neil Cohn "Visual Narrative Structure"; Department of Psychology, Tufts University; May 23, 2011; https://onlinelibrary.wiley.com/doi/pdf/10.1111/cogs.12016.
Fereshteh Amini et al.; "Understanding Data Videos: Looking at Narrative Visualization through the Cinematography Lens"; Proceedings of the 33rd Annual ACM Conference on Human Factors in Computing SystemsApr. 2015 pp. 1459-1468 https://doi.org/10.1145/2702123.2702431.
Xu, S., Bryan, C., Li, J. K., Zhao, J., & Ma, K. L. (Jun. 2018). Chart Constellations: Effective Chart Summarization for Collaborative and Multi-User Analyses. In Computer Graphics Forum (vol. 37, No. 3, pp. 75-86.
Li, J. K., Xu, S., Ye, Y. C., & Ma, K. L. (2020). Resolving Conflicting Insights in Asynchronous Collaborative Visual Analysis.
Das, S., Xu, S., Gleicher, M., Chang, R., & Endert, A. (2020). QUESTO: Interactive Construction of Objective Functions for Classification Tasks.
Gapminder Videos; Date downloaded Mar. 25, 2021; https://www.gapminder.org/videos/.
Article entitled "Needles in the 'Sheet'stack: Augmented Analytics to get Insights from Spreadsheets", by Atre et al., dated Jun. 15, 2020 (Year: 2020).
Article entitled "Authoring Data-Driven Videos with DataClips", by Annini et al., dated Jan. 2017 (Year: 2017).
Article entitled "Variations of Temperature, Precipitation, and Extreme Events in Heilongjiang River", by Yu et al., dated 2012 (Year: 2012).
E. Tufte. Visual Display of Quantitative Data. 1983.
T. Kluyver, B. Ragan-Kelley, F. Perez, B. E. Granger, M. Bussonnier, J. Frederic, K. Kelley, J. B. Hamrick, J. Grout, S. Corlay, et al. Jupyter notebooks-a publishing format for reproducible computational workflows. In ELPUB, pp. 87-90, 2016.
A. Lancichinetti, S. Fortunato, and J. Kertesz. Detecting the overlapping and hierarchical community structure in complex networks. New journal of physics, 11(3):033015, 2009.
Z. Wang, J. Ritchie, J. Zhou, F. Chevalier, and B. Bach. Data comics for reporting controlled user studies in human-computer interaction. IEEE Trans. on Visualization and Computer Graphics, pp. 1-1, 2020.
A. Satyanarayan and J. Heer. Lyra: An interactive visualization design environment. Computer Graphics Forum, 33(3):351-360, 2014.
A. Satyanarayan, D. Moritz, K. Wongsuphasawat, and J. Heer. Vega-lite: A grammar of interactive graphics. IEEE Trans. on Visualization and Computer Graphics, 23(1):341-350, Jan. 2017.
B. Bach, P. Dragicevic, D. Archambault, C. Hurter, and S. Carpendale. A descriptive framework for temporal data visualizations based on generalized space-time cubes. In Computer Graphics Forum, vol. 36, pp. 36-61, 2017.
B. Bach, Z. Wang, M. Farinella, D. Murray-Rust, and N. H. Riche. Design patterns for data comics. In Proc. of the ACM Conference on Human Factors in Computing Systems, 2018.
B. Bach, N. Kerracher, K. W. Hall, S. Carpendale, J. Kennedy, and N. Henry Riche. Telling stories about dynamic networks with graph comics. In Proc. of the ACM Conference on Human Factors in Computing Systems, pp. 3670-3682, 2016.
B. Bach, N. H. Riche, S. Carpendale, and H. Pfister. The emerging genre of data comics. IEEE computer graphics and applications, 37(3):6-13, 2017.
B. Shneiderman. The eyes have it: A task by data type taxonomy for information visualizations. In the craft of information visualization, pp. 364-371. Elsevier, 2003.
D. Shi, X. Xu, F. Sun, Y. Shi, and N. Cao. Calliope: Automatic visual data story generation from a spreadsheet. IEEE Trans. on Visualization and Computer Graphics, pp. 1-1, 2020.
D. Moritz, C. Wang, G. L. Nelson, H. Lin, A. M. Smith, B. Howe, and J. Heer. Formalizing visualization design knowledge as constraints: Actionable and extensible models in draco. IEEE Trans. on Visualization and Computer Graphics, 25(1):438-448, 2019.
D. Ren, M. Brehmer, B. Lee, T. Hollerer, and E. K. Choe. ChartAccent: Annotation for data-driven storytelling. In Proc. of the Pacific Visualization Symposium, 2017.
Global Terrorism Database—Kaggle. https://www.kaggle.com/START-UMD/gtd, 2019.
Gun Deaths in the US: 2012-2014—Kaggle. https://www.kaggle.com/hakabuk/gun-deaths-in-the-us, 2019.

(56) References Cited

OTHER PUBLICATIONS

H. Xia, N. H. Riche, F. Chevalier, B. D. Araujo, and D. Wigdor. Dataink: Direct and creative data-oriented drawing. In Proc. of the ACM Conference on Human Factors in Computing Systems, 2018.

J. J. Thomas and K. A. Cook. Illuminating the path: The research and development agenda for visual analytics. Technical report, PNNL, 2005.

J. Zhao, M. Fan, and M. Feng. Chartseer: Interactive steering exploratory visual analysis with machine intelligence. IEEE Trans. on Visualization and Computer Graphics, pp. 1-1, 2020.

J. Zhao, M. Glueck, P. Isenberg, F. Chevalier, and A. Khan. Supporting handoff in asynchronous collaborative sensemaking using knowledge-transfer graphs. IEEE Trans. on visualization and computer graphics, 24(1):340-350, 2017.

J. Han, M. Kamber, and J. Pei. Data Mining: Concepts and Techniques. Morgan Kaufmann, 2011.

J. Mackinlay. Automating the design of graphical presentations of relational information. ACM Trans. On Graphics, 5(2):110-141, 1986.

J. Poco and J. Heer. Reverse-engineering visualizations: Recovering visual encodings from chart images. In Computer Graphics Forum, vol. 36, pp. 353-363. Wiley Online Library, 2017.

K. Wongsuphasawat, D. Moritz, A. Anand, J. Mackinlay, B. Howe, and J. Heer. Towards a general-purpose query language for visualization recommendation in Proc. of the ACM Workshop on Human-In-the-Loop Data Analytics, pp. 4:1-4:6, 2016.

K. Wong Suphasawat, D. Moritz, A. Anand, J. Mackinlay, B. Howe, and J. Heer. Voyager: Exploratory analysis via faceted browsing of visualization recommendations. IEEE Trans. on Visualization and Computer Graphics, 22(1):649-658, 2015.

K. Subramanian, J. Maas, and J. Borchers. Tractus: Understanding and supporting source code experimentation in hypothesis-driven data science. In Proc. of the ACM Conference on Human Factors in Computing Systems, pp. 1-12, 2020.

M. B. Kery and B. A. Myers. Exploring exploratory programming. In Proc. of the IEEE Symposium on Visual Languages and Human-Centric Computing, pp. 25-29. IEEE, 2017.

M. Brehmer, B. Lee, B. Bach, N. H. Riche, and T. Munzner. Timelines revisited: A design space and considerations for expressive storytelling. IEEE Trans. on Visualization and Computer Graphics, 23(9):2151-2164, 2017.

M. Brehmer, B. Lee, N. Henry Riche, D. Tittsworth, K. Lytvynets, D. Edge, and C. White. Timeline storyteller: The design & deployment of an interactive authoring tool for expressive timeline narratives. In Proc. of the Computation+Journalism Symposium, pp. 1-5, 2019.

N. W. Kim, N. Henry Riche, B. Bach, G. Xu, M. Brehmer, K. Hinckley, M. Pahud, H. Xia, M. J. McGuffin, and H. Pfister. Datatoon: Drawing dynamic network comics with pen+touch interaction. In Proc. of the ACM Conference on Human Factors in Computing Systems, No. 105, 2019.

N. Cohn. Navigating comics: An empirical and theoretical approach to strategies of reading comic page layouts. Frontiers in Psychology, 4:186, 2013.

P. W. Thorndyke. Cognitive structures in comprehension and memory of narrative discourse. Cognitive psychology, 9(1):77-110, 1977.

P. O'Donovan, A. Agarwala, and A. Hertzmann DesignScape: Design with interactive layout suggestions. In Proc. of the ACM Conference on Human Factors in Computing Systems, pp. 1221-1224, 2015.

R. Chapman. Drawing Comics Lab: 52 Exercises on Characters, Panels, Storytelling, Publishing & Professional Practices. Quarry Books, Beverly, MA, 2012.

S. McCloud. Understanding Comics: The Invisible Art. William Morrow, 1994.

T. Groensteen. Comics and narration. Univ. Press of Mississippi, 2013.

College Scorecard Data. https://collegescorecard.ed.gov/data, 2019.

W.-T. Chu, C.-H. Yu, and H.-H. Wang. Optimized comics-based storytelling for temporal image sequences. IEEE Trans. on Multimedia, 17(2):201-215, 2015.

W.-T. Chu and C.-H. Yu. Optimized speech balloon placement for automatic comics generation. In Proc. of the int'l workshop on Interactive multimedia on mobile & portable devices, pp. 1-6, 2013.

Why 4-Panel Comics Now Dominate Our Screens—Wired. https://www.wired.com/story/four- panel-webcomics/, 2019.

X. Qian, E. Koh, F. Du, S. Kim, and J. Chan. A formative study on designing accurate and natural figure captioning systems. In Extended Abstracts of the ACM Conference on Human Factors in Computing Systems, pp. 1-6, 2020.

Y. Kim, K. Wong suphasawat, J. Hullman, and J. Heer. Graphscape: A model for automated reasoning about visualization similarity and sequencing. In Proc. of the ACM Conference on Human Factors in Computing Systems, 2017.

Z. Wang, S. Wang, M. Farinella, D. Murray-Rust, N. Henry Riche, and B. Bach. Comparing effectiveness and engagement of data comics and infographics. In Proc. of the ACM Conference on Human Factors in Computing Systems, pp. 253:1-253:12, 2019.

Z. Zhao, R. Marr, and N. Elmqvist. Data comics: Sequential art for data-driven storytelling. Technical report, University of Maryland, 2015.

Article entitled "Clustering and aggregation of relational data with applications to image database categorization", by Frigui dated Feb. 23, 2007 (Year: 2007).

U.S. Appl. No. 17/161,406, filed Oct. 18, 2021, Office Action.

U.S. Appl. No. 17/161,406, filed Jan. 11, 2022, Office Action.

U.S. Appl. No. 17/161,406, filed Jun. 9, 2022, Office Action.

U.S. Appl. No. 17/161,406, filed Sep. 14, 2022, Notice of Allowance.

TuanNhonDangandLelandWilkinson.2014.Scagexplorer:Exploring scatterplotsbytheirscegnostics. In2014IEEEPacificvisualizationsymposium. IEEE, 73-80.

Kevin Hu, Diana Orghian, and César Hidalgo. 2018. Dive: Amixed-initiative system supporting integrated datd exploration workflows. In Proceedings of the Workshop on Human-In-the-Loop Data Analytics. 1-7.

Po-Ming Law, Rahul C Basole, and Yanhong Wu. 2018. Duet: Helping data analysis novices conduct pairwise comparisons by minimal specification. IEEE transactions on visualization and computer graphics 25, 1 (2018), 427-437.

S. McKenna, N. Henry Riche, B. Lee, J. Boy, and M. Meyer. 2017. Visual Narrative Flow: Exploring Factors Shaping Data Visualization Story Reading Experiences. Computer Graphics Forum 36, (Jun. 3, 2017), 377-387. https://doi.org/10.1111/cgf.13195.

Shengjie Miao, Andrew Lee, and Sudeepa Roy. 2019. LensXPlain: visualizing and explaining contributing subsets for aggregate query asnwers. Proceedings of the VLDB Endowment 12, 12 (2019), 1898-1901.

Alvitta Ottley, Aleksandra Kaszoska, R. Jordan Crouse, and Evan M. Peck. 2019. The Curious Case of Combining Text and Visualisation. EuroVis 2019—ShortPapers (2019) , 5 pages. https://doi.org/10.2312/EVS.20191181ArtworkSize:5pagesISBN:9783038680901 Publisher:TheEurographics Association Version No. 121-125.

Arjun Srinivasan, Steven M Drucker, Alex Endert, and John Stasko. 2018. Augmenting visualizations with interactive data facts to facilitate interpretation and communications. IEEE transactions on visualization and computer graphics 25, 1 (2018), 672-681.

Charles D. Stolper, Bongshin Lee, Nathalie Henry Riche, and John Stasko. 2016. Emerging and Recurring Data-Driven Storytelling Techniques: Analysis of a Curated Collection of Recent Stories. Technical Report MSR-TR-2016-14. https://www.microsoft.com/en-us/research/publication/emerging-andrecurring-data-driven-storytelling-techniques-analysis-of-a-curated-collection-of-recent-stories/.

Xu, S., Bryan, C., Li, J. K., Zhao, J., & Ma, K. L. (Jun. 2018). Chart Constellations: Effective Chart Summarization for Collaborative and Multi-User Analysis. In Computer Graphics Forum (vol. 37, No. 3, pp. 75-86.

Article entitled "Needles in the 'Sheet'stack: Augmented Analytics to get Insights from Spreadsheets", by Atre et a., dated Jun. 15, 2020 (Year: 2020).

(56) References Cited

OTHER PUBLICATIONS

B. Bach, P. Dragicevic, D. Archambault, C. Hunter, and S. Carpendale. A descriptive framework for temporal data visualizations based on generalized space-time cubes. In Computer Graphics Forum, vol. 36, pp. 36-61, 2017.

N. W. Kim, N. Henry Riche, B. Bach, G. Xu, M. Brehmer, K. Hunckley, M. Pahud, H. Xia, M. J. McGuffin, and H. Pfister. Datatoon: Drawing dynamic network comics with pen+touch interaction. In Proc. of the ACM Conference on Human Factors in Computing Systems, No. 105, 2019.

Y. Kim, K. Wong suphasawat, J. Hullman, and J. Heer. Graphscape: A model for automated reasoning about visualization similarity and sequencing. In Proc. of the ACM Conference on Human Factros in Computing Systems, 2017.

\* cited by examiner

GENERATING VISUAL DATA STORIES

CROSS-REFERENCE TO RELATED APPLICATIONS

The present application is a continuation of U.S. application Ser. No. 17/161,406, filed on Jan. 28, 2021. The aforementioned application is hereby incorporated by reference in its entirety.

BACKGROUND

In recent years, analysts and engineers have developed data analysis systems to collect and analyze large amounts of raw data as part of detecting data trends or developing a graphical narrative. In particular, some data analysis systems can collect and summarize raw data. For example, some conventional automated data analysis systems attempt to identify statistics to simplify the process of creating narrative reports from large amounts of raw data but suffer from several technical shortcomings. In particular, conventional systems often fail to accurately identify data trends within time series or other datasets, misidentify relationships among complex datasets, and cannot present data insights as part of a snapshot of larger trends within input datasets.

As just suggested, some conventional automated data analysis systems fail to accurately generate narratives with meaningful insights from a large number of insights. In some cases, the number insights derived from a dataset can be large or seemingly infinite. Indeed, datasets can include multiple data fields, and data insights can be created from various combinations of the data fields and values corresponding to the data fields. For example, a data insight can include a statistical calculation derived from particular data fields and values. Due to the large number of such insights, many conventional systems cannot accurately focus on salient insights for creating a narrative graphic or report. In addition, such conventional systems inefficiently utilize computing resources by (i) generating an inordinate number of extracted insights for analysts to search through in a time consuming and tedious process and by (ii) inaccurately selecting uninteresting or irrelevant insights to generate as part of a narrative report.

Furthermore, many conventional systems fail to identify semantic relationships between a collection of data insights. Consequently, many conventional systems cannot identify relevant insights (or resulting data narratives) that show relationships between different types of data within a dataset and surface the same (or irrelevant) insights. Because of the limits of conventional systems, data analysts often manually review and search from insights not identified by conventional automated data analysis systems to create data narrative reports. Oftentimes, creating such narrative reports in this manner from a large collection of derived insights is time consuming and impractical. Moreover, in many cases, creating data narrative reports in this manner also results in an excessive number of steps executed by the computing devices of data analysts—at the expense of additional computing resources.

In addition to an excessive number of computing steps, conventional systems often cannot integrate multiple applications and tools to create narrative reports from insights found from raw input data. For instance, conventional systems often generate an excessive list of data insights that data analysts selectively transfer to a separate report-creation tool to construct presentable data narrative reports. Indeed, in many cases, conventional systems cannot integrate or automate multiple tools and thus require data analysts to perform a number steps to manually select data insights and to create data narrative reports using separate creation and/or editing tools for such reports.

In addition to failed integration and automation, many conventional systems also determine cursory insights that fail to provide a holistic understanding of the information present within the raw input data. For instance, conventional systems often primarily focus on enumerating (and analyzing) combinations of different data fields (e.g., data of a first header compared to data of a second header) from input data tables to generate insights. As an example, conventional systems often simply generate insights that calculate statistical facts (e.g., a mean) between values of different data fields (e.g., between headers) in lieu of providing in-depth insights that identify unique and meaningful analyses of the raw input data.

SUMMARY

This disclosure describes embodiments of systems, non-transitory computer-readable media, and methods that solve one or more of the foregoing problems. For instance, the disclosed systems intelligently and automatically analyze input data and generate visual data stories depicting graphical visualizations from data insights determined from the input data. As suggested, the disclosed systems can automatically extract data insights utilizing an in-depth statistical analysis of dataset groups from data-attribute categories within the input data. Based on the data insights, the disclosed systems can automatically generate exportable visual data stories to visualize the data insights, provide textual or audio-based natural language summaries of the data insights, and animate such data insights in videos. Such a visual data story may, for instance, include graphs and natural language summaries comparing particular groups within the larger dataset, such as visual data stories comparing data trends between countries (or other data groups) in time-series data for viral infections, stock-index values, or various other raw-data counts.

In addition to generating visual data stories, the disclosed systems can select a relevant visual data story to display on a client device. In some cases, for instance, the disclosed systems generate a visual-data-story graph comprising nodes representing visual data stories and edges representing similarities (and/or differences) between the visual data stories. Based on the visual-data-story graph, in some instances, the disclosed systems select a relevant visual data story to display on a graphical user interface. Such a graphical user interface can support browsing or provide similar (or dissimilar) visual data stories in relation to the selected visual data story. By generating and selecting relevant visual data stories, in many instances, the disclosed systems provide a computationally-guided process of automatically generating presentable and coherent visual data stories with in-depth data insights from complex, raw input data.

BRIEF DESCRIPTION OF THE DRAWINGS

The detailed description refers to the accompanying drawings in which.

DETAILED DESCRIPTION

Figure 1:
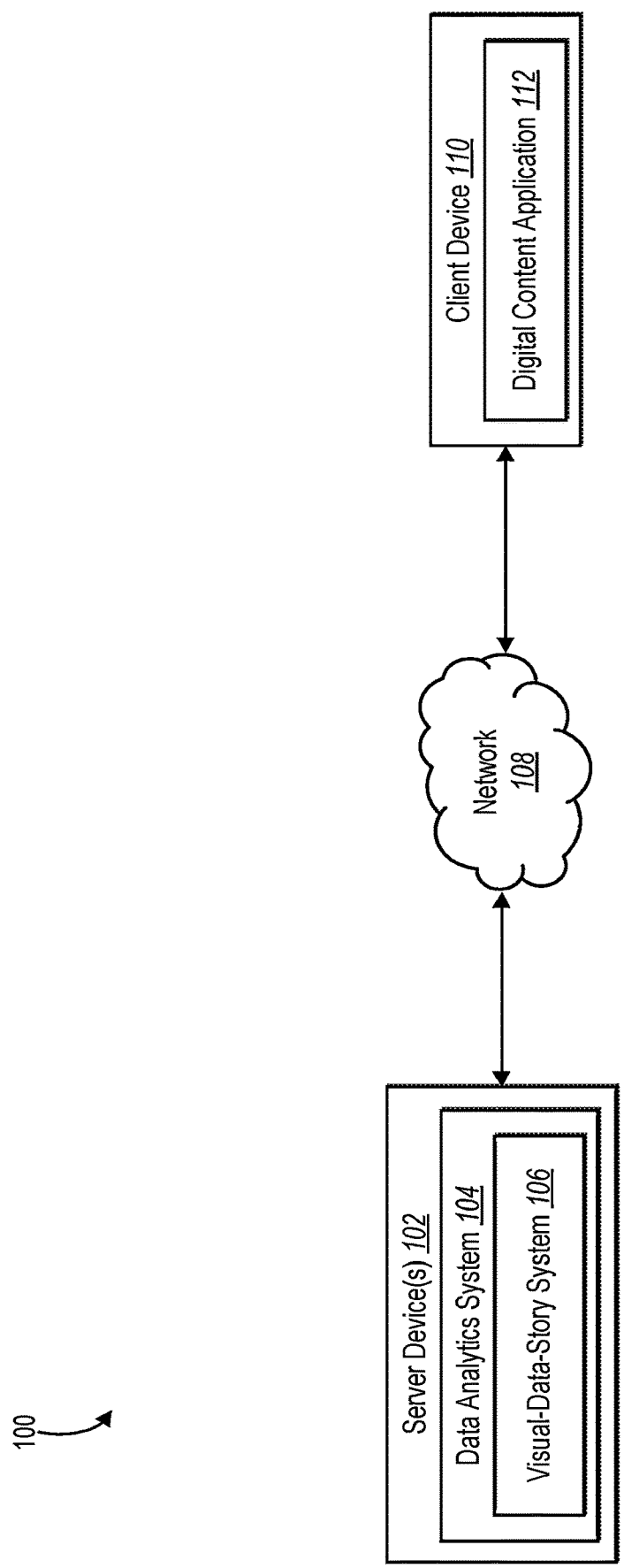
FIG. 1 illustrates a schematic diagram of an example system in which a visual-data-story system operates in accordance with one or more embodiments.

This disclosure describes embodiments of a visual-data-story system that generates visual data stories comprising graphical visualizations and natural language summaries of data insights determined from raw input data. For instance, the visual-data-story system compares data-attribute values corresponding to dataset groups (e.g., countries, demographic populations, organizations) from data-attribute categories in a dataset (e.g., raw input data). Based on such a comparison, the visual-data-story system determines data insights across different dataset groups and generates visual data stories that both graphically visualize and summarize the data insights comparing different dataset groups. Having such visual data stories, the visual-data-story system generates a visual-data-story graph that includes nodes for the visual data stories and edges to represent similarity distances between data-story properties of visual-data-story pairs from the visual data stories. Upon selecting a relevant visual data story based on the similarity distances within the visual-data-story graph, the visual-data-story system displays, within a graphical user interface, the selected visual data story and/or a selectable option for a similar visual-data story in relation to the selected visual data story.

As just mentioned, in one or more embodiments, the visual-data-story system determines data insights from input data to generate visual data stories. In particular, in some embodiments, the visual-data-story system receives raw input data (e.g., tabular data) having one or more data-attribute categories (e.g., tabular headers). In certain instances, the visual-data-story system analyzes (e.g., using statistical analyses and/or modelling) data-attribute values (e.g., cell values from tabular data) to determine data insights. For example, the visual-data story system determines data insights across different dataset groups utilizing a statistical analysis that compares data-attribute values corresponding to the dataset groups. In some embodiments, the visual-data-story system analyzes dataset groups within data-attribute categories to determine data insights of one or more dataset groups (e.g., a grouping of data-attribute values in relation to a common data-attribute value within a data-attribute category).

In one or more embodiments, the visual-data-story system utilizes data-attribute values from one or more dataset groups to determine data insights, such as data trends, energy ratios, and/or data distributions from the data-attribute values. As an example, the visual-data-story system utilizes a linear least-squares regression and/or a sliding time-window with data-attribute values of a dataset group in a time series to determine a data-trend insight. To illustrate, the visual-data-story system determines detected trends for a dataset group or a time-series analysis of the dataset group, such as increases or decreases in viral infections or stock-index values in particular countries across time.

Based on such data insights, in some embodiments, the visual-data-story system generates a visual data story. For instance, in one or more instances, the visual-data-story system utilizes a predefined template having certain data story properties (e.g., data-attribute category name, data-attribute values, one or more dataset group names, one or more dataset group insights, and/or data insight comparisons) to organize (or utilize) determined data insights into meaningful visual data stories. Furthermore, in some cases, the visual-data-story system generates the visual data story to visually represent the determined data insights and comparisons of the data insights. For example, the visual-data-story system visually represents determined data insights in a visual data story using visual charts and/or video animations to indicate the data insights. In addition to such graphics, in certain instances, the visual-data-story system also generates text-based and/or audio-based natural language summaries for the determined data insights as part of the visual data story.

Having generated multiple visual data stories comparing different data groups, the visual-data-story system can also generate a visual-data-story graph. For instance, in one or more embodiments, the visual-data-story system generates a visual-data-story graph representing the visual data stories and their relationships to other visual data stories. In particular, in one or more instances, the visual-data-story system determines similarity distances between data-story properties of visual-data-story pairs from the generated visual data stories. Then, the visual-data-story system generates nodes to represent the visual data stories and edges between the nodes to represent the similarity distances (or similarity scores calculated from the similarity distances). Furthermore, in some cases, the visual-data-story system selects visual data stories from the visual-data-story graph to provide selectable recommendations of similar and/or dissimilar visual data stories within a graphical user interface in relation to a displayed (or selected) visual data story.

Such a graphical user interface provides a tool to explore and customize for presentation visual data stories selected by—or determined similar (or dissimilar) to visual data stories selected by—the visual-data-story system. For instance, in some embodiments, the visual-data-story system provides, for display within a graphical user interface, a visual data story having one or more visual elements (e.g., a visualized and/or animated chart), text summaries, selectable options for audio summaries, and/or other selectable options for interactions with the visual data story (e.g., bookmarking the visual data story). In some cases, such visual data stories include video animations to illustrate data insights or to highlight given data insights from the visual data story. In addition, in some embodiments, the displayed graphical user interface also includes selectable options to bookmark one or more visual data stories to combine (or stitch together) the visual data stories into a coherent visual data story (e.g., a stitched-visual-data story) that presents one or more data insights from the raw input data.

The disclosed visual-data-story system provides a number of advantages over conventional automated data analysis systems. As mentioned above, conventional systems fail to accurately generate narratives with accurate data insights and instead require time consuming and tedious review by data analysts to generate meaningful narratives from raw input data. Unlike conventional systems, the visual-data-story system efficiently and intelligently automates a process of generating relevant visual data stories—by starting with simple input data and outputting select visual data stories. For example, in contrast to the painstaking-review processes of conventional systems, the visual-data-story system generates and selects for display a relevant visual data story by determining similarity distances between visual data stories and generating a visual-data-story graph that guides selection. Additionally, unlike conventional systems that require time consuming insight searches, the visual-data-story system sometimes determines relationships between the visual data stories using such a visual-data-story graph and also makes the full generated set of visual data stories easily searchable and/or identifiable. Accordingly, in many instances, the visual-data-story system automates the process of generating relevant visual data stories (e.g., from simple input data to generating reports that include visual data stories) to reduce the computational resources and time needed to generate such meaningful data stories.

In addition to intelligently automating a process for generating visual data stories, the visual-data-story system generates graphical user interfaces that increase the efficiency and ease of quickly reviewing, searching through, and selecting visual data stories. For instance, by providing, for display within a graphical user interface, a selected visual data story and recommended visual data stories from the visual visual-data-story graph, the visual-data-story system promotes quick and easy navigation through data stories with selectable options to select the visual data stories to include in a presentable medium (e.g., a final visual data story report). As such, in one or more embodiments, the visual-data-story system creates a computationally-guided process of automatically generating presentable and coherent visual data stories that indicate in-depth data insights directly from raw input data—with fewer navigational steps and fewer specialized skills in data analysis.

Furthermore, unlike conventional approaches that require utilizing multiple applications to generate a presentable narrative from raw data, the visual-data-story system provides an efficient, streamlined pipeline that intakes complex, raw data and outputs presentable visual data stories within a single platform. For example, in some cases, the visual-data-story system utilizes raw input data to generate visual data stories, provide selectable options to quickly select form the visual data stories (e.g., bookmark), and combine (e.g., stitch) the selected visual data stories to generates a set of exportable visual data stories that present data insights via visual illustrations, text, audio (e.g., by generating an audio file), and/or video (e.g., by generating a video file). Indeed, in one or more embodiments, the visual-data-story system generates such exportable visual data stories within a single platform-rather than the cumbersome approach of conventional systems that require opening multiple applications, transferring data between the multiple applications, and maintaining consistencies/formatting requirements between the multiple applications.

Furthermore, in one or more embodiments, the visual-data-story system also generates visual data stories that accurately and intelligently analyze raw input data. For example, the visual-data-story system performs statistical analyses (and/or modelling) to determine in-depth data insights (such as trend detection and time-series analysis) between subgroups (e.g., dataset groups) of each data attribute in the raw input data to generate more detailed data insights. By doing so, the visual-data-story system automatically generates visual data stories that provide more in-depth data insights from input data compared to the cursory data insights of many conventional systems. For example, in some instances, the visual-data-story system utilizes input datasets to determine detailed data insights (e.g., between subgroups), such as "in the U.S., the number of female customer visits is 82.09% of the total number of customer visits—similar to the percentage of female customer visits in Brazil" rather than only determining a data insight indicating that "the number of female customer visits is 80.09% of the total number of customer visits."

Indeed, in many instances, the visual-data-story system introduces an unconventional approach to generate visual data stories from raw input data. For instance, in some embodiments, the visual-data-story system utilizes an unconventional ordered combination of actions to extract in-depth data insights from input data, generate visual data stories for the data insights, and provide relevant visual data stories using a generated visual-data-story graph to generate a meaningful and coherent visual data story from raw input data. In other words, the visual-data-story system introduces a process for generating visual data stories from raw input data that is not utilized by conventional systems. By utilizing a virtually infinite (or excessively large) collection of data insights from the raw input data and a visual-data-story graph for the data insights, the visual-data-story system generates visual data stories that could not be practically determined by humans.

Turning now to the figures, FIG. 1 illustrates a schematic diagram of one embodiment of a system 100 (or environment) in which a visual-data-story system 106 operates in accordance with one or more embodiments. As illustrated in FIG. 1, the system 100 includes server device(s) 102, a network 108, and a client device 110. As further illustrated in FIG. 1, the server device(s) 102 and the client device 110 communicate via the network 108.

As shown in FIG. 1, the server device(s) 102 include a data analytics system 104 which further includes the visual-data-story system 106. For instance, the server device(s) 102 includes, but is not limited to, a computing (or computer) device (as explained below with reference to FIG. 13). In some embodiments, the visual-data-story system 106 receives (or identifies) raw input data and determines one or more data insights from the data. Based on the data insights, in some embodiments, the visual-data-story system 106 generates visual data stories and selects a relevant visual data story for display using a story graph from the visual data stories, as described above and further below.

As also shown in FIG. 1, the system 100 includes the client device 110. In one or more embodiments, the client device 110 includes, but is not limited to, a mobile device (e.g., smartphone, tablet), a laptop, a desktop, or any other type of computing device, including those explained below with reference to FIG. 13. In some instances, although not shown in FIG. 1, the client device 110 is operated by a user to perform a variety of functions (e.g., via a digital content application 112). For example, the client device 110 performs functions such as, but not limited to, inputting raw data, requesting visual data stories, interacting with visual data stories, and/or selecting visual data stories (e.g., for stitching). In one or more embodiments, the client device 110 receives and displays visual data stories (and various other elements) from the visual-data-story system 106. Furthermore, as shown in FIG. 1, the client device 110 communicates with the server device(s) 102 via the network 108.

To access the functionalities of the visual-data-story system 106 (as described above), in certain embodiments, a user interacts with the digital content application 112 on the client device 110. For example, the digital content application 112 includes one or more software applications (e.g., to display, utilize, or interact with visual data stories and input data in accordance with one or more embodiments herein) installed on the client device 110. In some instances, the digital content application 112 is hosted on the server device(s) 102. In addition, when hosted on the server device(s), the digital content application 112 is accessed by the client device 110 through a web browser and/or another online interfacing platform and/or tool.

Although FIG. 1 illustrates the visual-data-story system 106 being implemented by a particular component and/or device within the system 100 (e.g., the server device(s) 102), in some embodiments, the visual-data-story system 106 is implemented, in whole or part, by other computing devices and/or components in the system 100. For instance, in some embodiments, the visual-data-story system 106 is implemented on the client device 110. In particular, in some embodiments, the client device 110 generates the visual data stories in accordance with one or more embodiments.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 13. Furthermore, although FIG. 1 illustrates the server device(s) 102 and the client devices 110 communicating via the network 108, in certain embodiments, the various components of the system 100 communicate and/or interact via other methods (e.g., the server device(s) 102 and the client device 110 communicating directly).

As mentioned above, in one or more embodiments, the visual-data-story system 106 provides a computationally-guided process of automatically generating presentable and coherent visual data stories that indicate data insights directly from input data. For example, FIG. 2 illustrates the visual-data-story system 106 determining data insights, generating visual data stories and visual-data-story graphs, and displaying visual data stories and recommendations for visual data stories utilizing a computationally-guided process.

Figure 2:
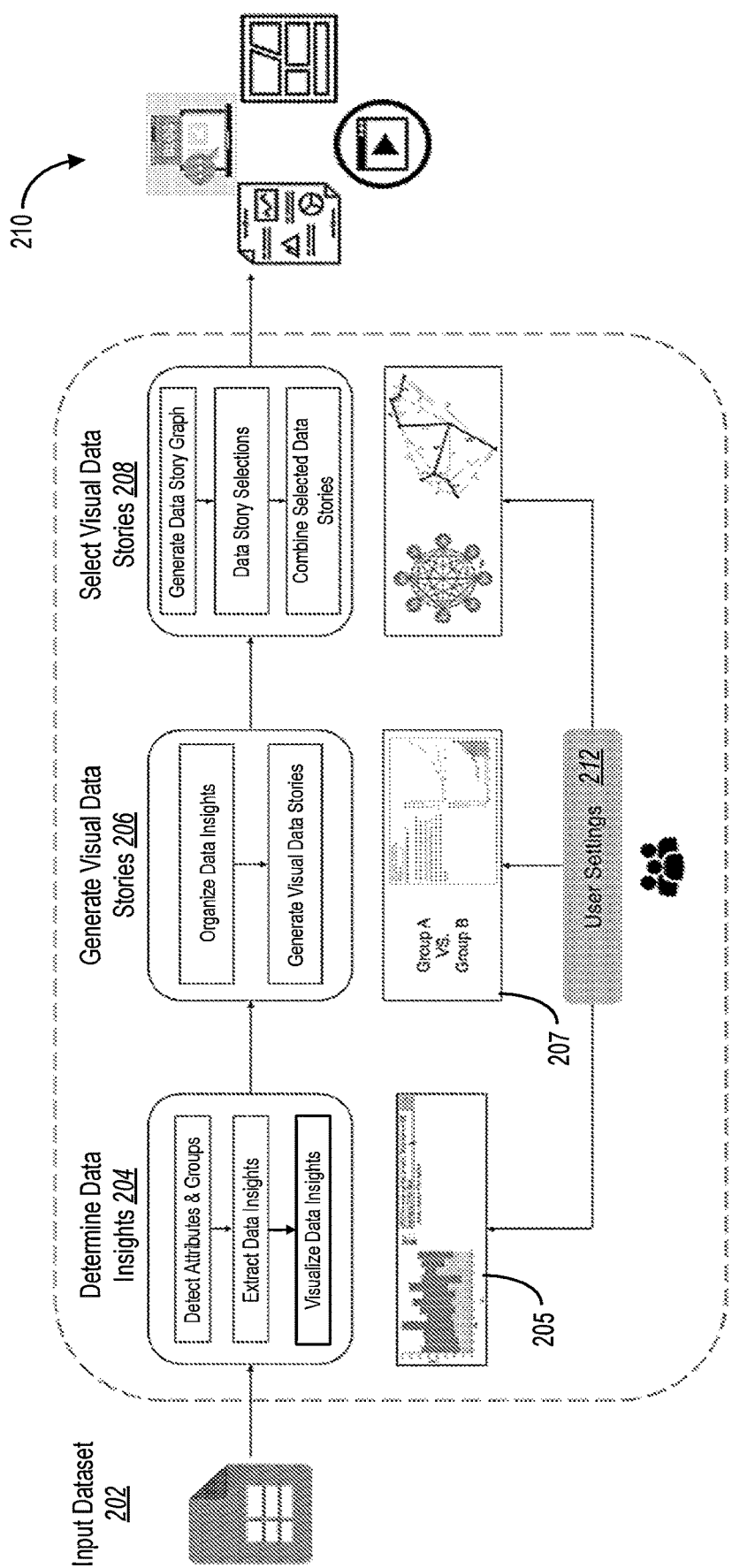
FIG. 2 illustrates an overview of a visual-data-story system generating visual data stories and selecting a visual data story for display and exploration in accordance with one or more embodiments.

As shown in FIG. 2, the visual-data-story system 106 receives an input dataset 202. Then, as illustrated in FIG. 2, the visual-data-story system 106 determines data insights in an act 204 from the data-attribute values of the input dataset 202 by detecting attributes and dataset groups and extracting data insights for the attributes and dataset groups. Subsequently, the visual-data-story system 106 utilizes the determined data insights to generate visual data stories in an act 206 by organizing data insights and generating visual data stories. As further shown in FIG. 2, the visual-data-story system 106 selects visual data stories in an act 208. Indeed, as also shown in FIG. 2, the visual-data-story system 106 generates a visual data story 210 in various formats within a graphical user interface from one or more visual data stories.

As just mentioned, the visual-data-story system 106 receives (or identifies) an input dataset (e.g., as shown in FIG. 2). In one or more embodiments, the visual-data-story system 106 receives an input dataset as a file upload from a client device (e.g., client device 110). In some instances, the visual-data-story system 106 receives (or identifies) a dataset from a stored file. In one or more embodiments, a dataset includes a collection of values. In some instances, a dataset includes a collection of values that are organized according to data-attribute categories.

In particular, in some embodiments, a dataset includes a collection of tabular data having data values (e.g., data-attribute values) that are organized according to data-attribute categories to form tables having column and/or row headers and data values corresponding to the column and/or row headers In some cases, a dataset can include tabular data that is also recorded (or organized) over a time period. For instance, a dataset can include, but is not limited to, a spreadsheet file (e.g., .xls file, .numbers file, .gsheet file), text files organized using notations and/or symbols (e.g., a CSV file, TSV file, DSV file, JSON file), and/or a database file (e.g., .sqlite file, .sql file). In addition, in one or more embodiments, data-attribute values include data values within cells, columns, and/or rows of a dataset (e.g., various combinations of textual and/or numerical values within a dataset).

As indicated above, in one or more embodiments, the data values of a dataset are organized according to data-attribute categories. In some embodiments, a data-attribute category includes a label or other indicator that categorizes a set of data values to a given concept, object, place, and/or person. For example, a data-attribute category sometimes includes a header within tabular data. Furthermore, a dataset group sometimes includes a collection of data-attribute values from one or more data-attribute categories that are associated with a specific data-attribute value of a given data-attribute category.

To illustrate, in one or more embodiments, a dataset includes tabular data that includes data-attribute categories, such as countries, cities, and daily COVID-19 cases. Each of the data-attribute categories (e.g., countries, cities, and daily COVID-19 cases) include data-attribute values. For example, the data-attribute category of countries has data-attribute values of U.S.A., Brazil, China, India, Australia, and Italy (as cell values). In addition, as an example, a dataset group for the data-attribute value of U.S.A. (from the countries data-attribute category) includes the cities and daily COVID-19 case data-attribute values that correspond to the data-attribute value of U.S.A.

As further shown in the act 204 of FIG. 2, the visual-data-story system 106 determines data insights from an input dataset. In particular, in one or more embodiments, the visual-data-story system 106 detects data-attribute categories within an input dataset and dataset groups as part of the data-attribute categories. Indeed, dataset groups (e.g., countries, cities, demographic groups, vehicle manufacturer) are specific examples of data-attribute categories. In one or more embodiments, the visual-data-story system 106 extracts (or derives) data insights from the data-attribute values in the dataset by comparing data-attribute values that correspond to dataset groups or other data-attribute categories. For example, the visual-data-story system 106 utilizes statistical analyses and/or modelling to detect trends or time-series interpretations from attribute-data values belonging to a data-attribute category (e.g., a dataset group). The visual-data-story system 106 determining one or more data insights from an input dataset is described in greater detail below (e.g., in relation to FIGS. 3 and 4).

In one or more embodiments, a data insight includes information that provides an interpretation and/or understanding from an analytical and/or statistical assessment of data from a dataset. For example, a data insight includes detected trends in a time series and/or time series analysis that include statistical evaluations (e.g., means, medians, modes, data extremums, data minimums), data distributions from the dataset, and/or detected significant data value changes. In one or more embodiments, the visual-data-story system 106 determines data insights as numerical values, a set of values that correspond to a trend or significant distribution, and/or as flags that indicate particular events (e.g., significant data value changes, trend changes).

In some instances, as shown in the act 204 of FIG. 2, the visual-data-story system 106 visualizes determined data insights. For example, the visual-data-story system 106 visualizes a determined data insight as a visual data story (e.g., a visual data story piece) that includes a graphical visualization and natural language summary specifically for the determined data insight. To illustrate, as shown in FIG. 2, the visual-data-story system 106 visualizes a data insight as a visual data story 205.

As further shown in the act 206 of FIG. 2, the visual-data-story system 106 generates visual data stories. In one or more embodiments, the visual-data-story system 106 utilizes one or more detected data insights to generate visual data stories. For instance, the visual-data-story system 106 utilizes a predefined template having certain data story properties (e.g., data-attribute category name, data-attribute values, one or more dataset group names, one or more dataset group insights, and/or data insight comparisons) to visualize data insights within visual data stories. Moreover, in one or more embodiments, the visual-data-story system 106 generates a visual data story from a singular determined data insight and/or multiple data insights. To illustrate, as shown in FIG. 2, the visual-data-story system 106 generates a visual data story 207 that provides a graphical visualization and/or natural language summary of a comparison between determined data insights for multiple dataset groups (e.g., Group A vs. Group B). The visual-data-story system 106 generating visual data stories from data insights is described in greater detail below (e.g., in relation to FIGS. 3, 4, and 6).

In some embodiments, a visual data story includes a graphical visualization of a data insight. For instance, a visual data story includes various combinations of graphical elements (e.g., charts, graphs, bars), text, and audio to illustrate a data insight determined from a dataset. In some instances, a visual data story includes a natural language summary (e.g., text and/or audio-based) generated from a data insight. In particular, in one or more embodiments, the visual-data-story system 106 generates a visual data story that displays visual charts from data insights to compare the data insights while also providing text- and/or audio-based summaries for the compared data insights.

As further shown in the act 208 of FIG. 2, the visual-data-story system 106 selects visual data stories based on visual-data-story relationships. In particular, in some cases, the visual-data-story system 106 determines visual-data-story relationships by generating a visual-data-story graph representing similarities or dissimilarities between visual data stories. Indeed, in some embodiments, the visual-data-story system 106 utilizes the similarity or dissimilarity relationships between visual data stories to select visual data stories to surface within a graphical user interface (e.g., as recommended visual data stories). The visual-data-story system 106 generating and utilizing a visual-data-story graph is described in greater detail below (e.g., in relation to FIG. 5).

In one or more embodiments, a visual-data-story graph includes a collection of nodes and edges that represent visual data stories and relationships between the visual data stories. For instance, a visual-data-story graph represents visual data stories as nodes and similarity distances between data-story properties of visual-data-story pairs from the visual data stories as the edges that connect the nodes. Indeed, in one or more embodiments, a visual-data-story graph incudes nodes representing the available auto-generated visual data stories and a set of edges that represent all positive pairwise similarities (e.g., via similarity distances) between the visual-data-story pairs.

As also shown in FIG. 2, the visual-data-story system 106 selects visual data stories in the act 208 by receiving visual data story selections from a client device and combining selected visual data stories to generate a larger (or final) visual data story for the input dataset 202. For example, the visual-data-story system 106 provides visual data stories from the visual-data-story graph as selectable visual data stories (e.g., as recommendations) in a graphical user interface of a client device. In some instances, the visual-data-story system 106 identifies a user interaction with a selectable visual data story or a selection option corresponding to the visual data story (e.g., a bookmark selection button) as a received selection of the visual data story. Then, in some instances, the visual-data-story system 106 combines (stitches) the selected (or bookmarked) visual data stories to form (or generate) a larger visual data story that represents the selected visual data stories in a singular stitched-visual-data story (or report). The visual-data-story system 106 combining selected visual data stories to generate a larger visual data story is described in greater detail below (e.g., in relation to FIG. 6).

In some instances, as shown in FIG. 2, the visual-data-story system 106 receives user settings 212 from a user. For example, in one or more embodiments, the visual-data-story system 106 receives user settings to determine parameters for data insight determinations. For example, the visual-data-story system 106 receives a threshold percentage for determining trend insights (e.g., as described below in relation to FIG. 4) and/or a percentage $\alpha$ of a range of the distribution (e.g., as described below in relation to function (2)). Furthermore, in one or more embodiments, the visual-data-story system 106 also receives a threshold distance and/or threshold similarity score (e.g., as described below in relation to functions (3)-(10)) as a user setting.

In one or more embodiments, the visual-data-story system 106 receives user settings that indicate a filter. In particular, in some embodiments, the visual-data-story system 106 receives filter values to filter a visual-data-story graph (for recommended visual data stories). As an example, in one or more embodiments, the visual-data-story system 106 receives a filter value for a data-attribute value. Then, in some instances, the visual-data-story system 106 filters the visual-data-story graph to include visual data stories that include the filter value for the data-attribute value. For example, if the filter value indicates to focus on dataset groups having the data-attribute value of "U.S.," the visual-data-story system 106 filters the visual-data-story graph (or visual-data-story space) to only include visual data stories that include "U.S." as a dataset group.

As an example, the visual-data-story system 106 can generate infographics with data charts from a dataset without a user having technical knowledge in data analysis. To illustrate, the visual-data-story system 106 receives a dataset for COVID-19 cases in various countries and globally from a user that desires to create a presentable data story from the raw dataset. Upon receiving the dataset, in one or more embodiments, the visual-data-story system 106 automatically generates a number of visual data stories comparing COVID-19 infection cases in different locations from the dataset and displays, within a graphical user interface, a visual data story comparing the COVID-19 cases between Global and the U.S. (e.g., on a data story user interface panel) and also displays recommended visual data stories (e.g., on a data story recommendation user interface panel).

In addition to displaying a selected visual data story selected by the visual-data-story system 106, in some embodiments, the visual-data-story system 106 receives an indication of a user interaction with a selectable option to select the visual data story comparing the COVID-19 situation between Global and the U.S. Furthermore, in one or more embodiments, the visual-data-story system 106 receives an indication of a user interaction with selectable options to select visual data stories from the recommended visual data stories (e.g., on the data story recommendation user interface panel) that have a similar increasing data trend as the Global vs. the U.S. visual data story (e.g., a Global vs. Brazil visual data story having an increasing trend). Likewise, in some instances, the visual-data-story system 106 also receives an indication of a user interaction with selectable options to select visual data stories from the recommended visual data stories that have a dissimilar (decreasing) trend to that of the Global vs. the U.S. visual data story (e.g., a Global vs. Australia visual data story having a decreasing trend).

Upon receiving the selected visual data stories, in one or more embodiments, the visual-data-story system 106 receives an indication of a user interaction with a selectable option to combine the selected visual data stories. As a result, in one or more embodiments, the visual-data-story system 106 combines (or stitches) the selected visual data stories into a larger coherent visual data story (e.g., as a report) that includes the similar and dissimilar selected visual data stories in accordance with one or more embodiments. By doing so, in one or more embodiments, the visual-data-story system 106 quickly and automatically presents data insight patterns and generates meaningful visual data stories within a short amount of time compared to conventional approaches.

Figure 3:
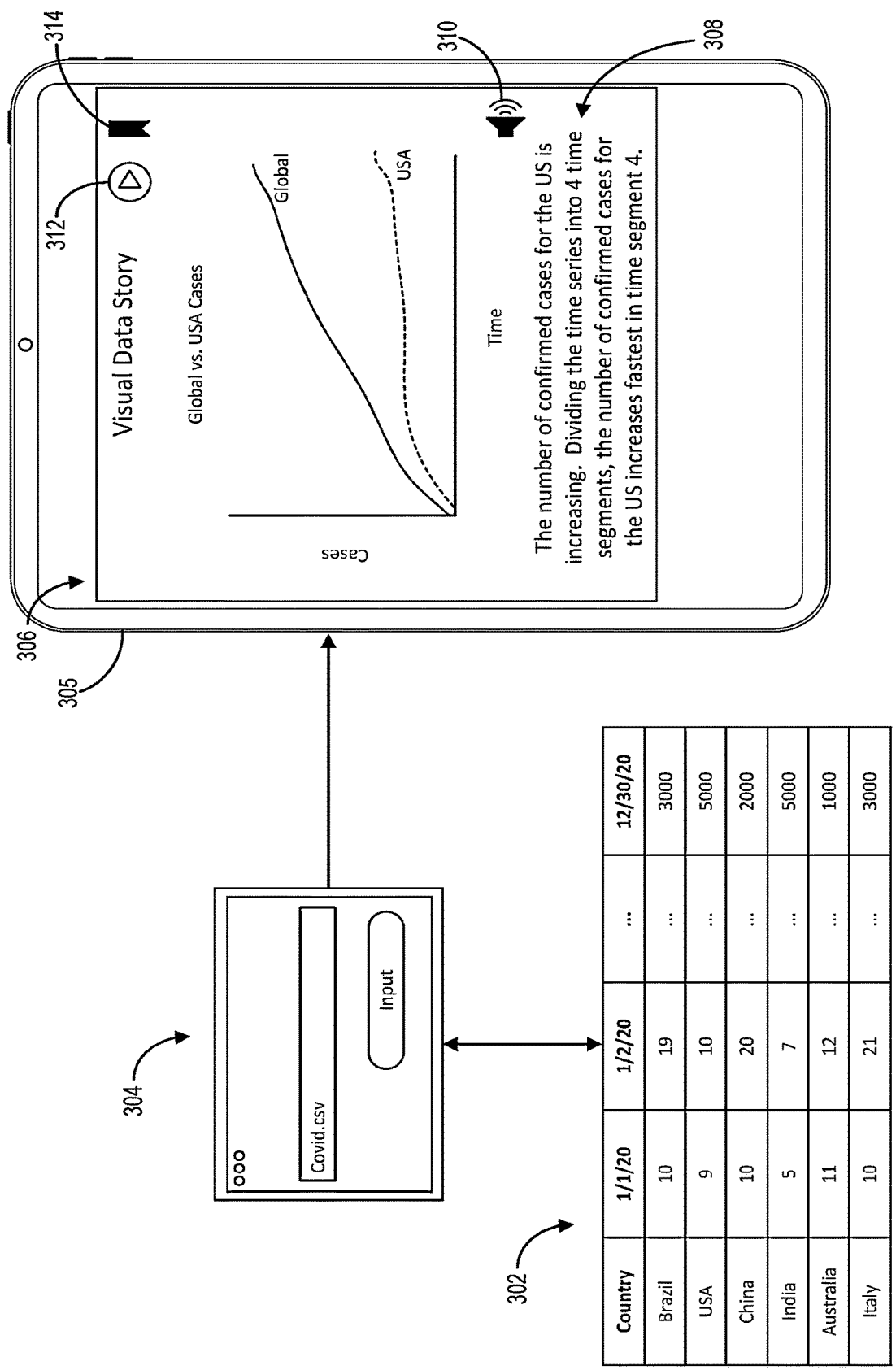
FIG. 3 illustrates a visual-data-story system generating a visual data story from input data and components of the visual data story in accordance with one or more embodiments.

As mentioned above, in one or more embodiments, the visual-data-story system 106 generates a visual data story. For example, FIG. 3 illustrates a visual data story 306 that is automatically generated by the visual-data-story system 106 from an input dataset 302. As shown in FIG. 3, the visual-data-story system 106 receives the input dataset 302 through a file upload user interface 304. Then, as shown in FIG. 3, the visual-data-story system 106 utilizes the input dataset 302 to generate and provide, for display within a graphical user interface 305, the visual data story 306.

As shown in FIG. 3, the visual-data-story system 106 generates the visual data story 306 having a graphical visualization (e.g., a trend chart) from a data insight determined from the input dataset 302. In particular, in FIG. 3, the visual data story 306 illustrates the data insight from a comparison of the COVID-19 situation between Global and the U.S. from the input dataset 302. Indeed, as shown in FIG. 3, the visual-data-story system 106 automatically generates a chart (as a visual data story) to compare the number of COVID-19 cases between the U.S.A. vs Globally in a time series.

Additionally, as shown in FIG. 3, the visual-data-story system 106 also provides, for display within the graphical user interface 305, a text-based natural language summary 308 of the data insight within the visual data story 306. As shown in FIG. 3, the text-based natural language summary 308 is automatically generated to describe the data insight illustrated in the graphical visualization of the visual data story 306. Moreover, as illustrated in FIG. 3, the visual-data-story system 106 also provides, for display within the graphical user interface 305, a selectable option 310 to play an audio-based natural language summary (e.g., a text to speech audio recording of the text-based natural language summary 308.

As also shown in FIG. 3, the visual-data-story system 106 also provides, for display within the graphical user interface 305, a selectable option 312 to play a video animation of the visual data story. In particular, in one or more embodiments, the video animation generated by the visual-data-story system 106 displays an illustration of the data insight and indicates, within the visual-visual-data-story graphical visualization, the one or more data insights described within the text-based natural language summary 308. Additionally, as shown in FIG. 3, the visual-data-story system 106 provides, for display within the graphical user interface 305, a selectable option 314 to bookmark (or select) the visual data story 306 (e.g., to generate a larger visual data story and/or to save the visual data story).

Figure 4:
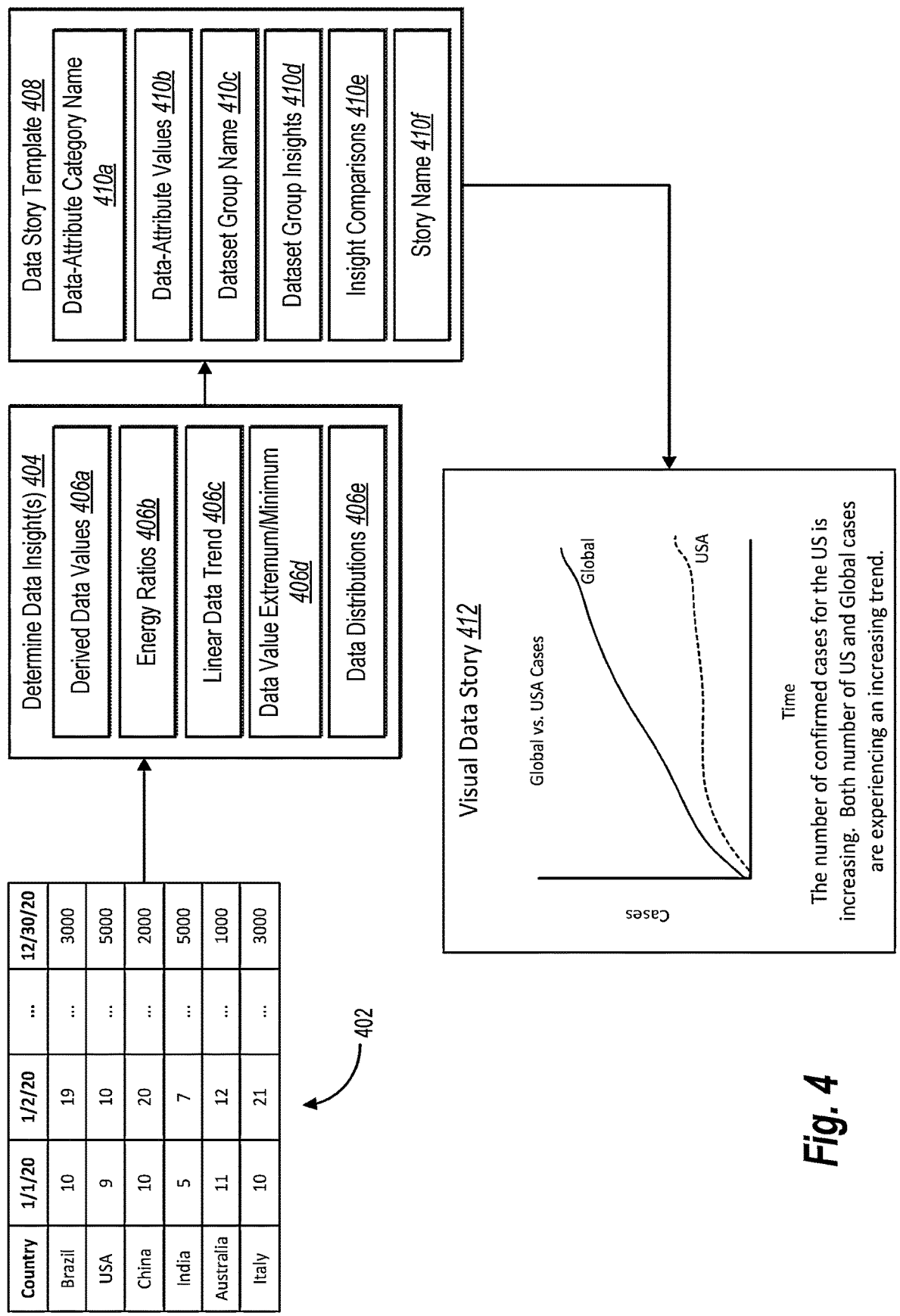
FIG. 4 illustrates a visual-data-story system determining data insights from input data and generating a visual data story utilizing a data story template in accordance with one or more embodiments.

To generate visual data stories, in one or more embodiments, the visual-data-story system 106 first determines data insights from input data. For example, FIG. 4 illustrates the visual-data-story system 106 generating a visual data story from various data insight determinations and a data story template. As shown in FIG. 4, the visual-data-story system 106 determines data insight(s) in act 404 for various dataset groups from an input dataset 402. Upon determining data insight(s) in the act 404, the visual-data-story system 106 utilizes the data insight(s) with a data story template 408 having data story properties to structure a data story. Indeed, as illustrated in FIG. 4, the visual-data-story system 106 utilizes the determined data insight(s) from the act 404 with the data story template 408 to generate a visual data story 412.

As an example, in reference to FIG. 4, the visual-data-story system 106 identifies a dataset group (U.S.A.) and a dataset group (Global) (e.g., a summation of each dataset groups) from the "Country" data-attribute category in the input dataset 402. Then, the visual-data-story system 106 determines an increasing trend (e.g., the linear data trend 406c) for the dataset group (U.S.A.). In addition, in reference to FIG. 4, the visual-data-story system 106 also determines an increasing trend (e.g., the linear data trend 406c) for the dataset group (Global).

Subsequently, as shown in FIG. 4 and as an example, the visual-data-story system 106 utilizes the determined increasing trend (from the act 404) for the dataset group (U.S.A.) and a dataset group (Global) with the data story template 408 to generate the visual data story 412. Indeed, as illustrated in FIG. 4, the visual-data-story system 106 structures determined data insights (e.g., the determined increasing trend) by using the data story properties within the data story template 408 to generate a graphical visualization (e.g., charts and/or video animations) and natural language summary for the visual data story 412.

To continue the example, as shown in FIG. 4, the visual-data-story system 106 generates the visual data story 412 by extracting the data-attribute category name 410a (e.g., "Country"), data-attribute values 410b (e.g., the data cell values from the data-attribute categories of Country and each individual day), dataset group name 410c (e.g., the subgroup of "U.S.A." and "Global"), dataset group insights 410d (e.g., the increasing trend determined for the subgroup of U.S.A. and for the subgroup of Global), insight comparisons 410e (e.g., similarities and differences between the dataset group insights), and a story name 410f. As indicated in FIG. 4, the story name 410f is a combination of the subgroup categorical data values (i.e., dataset group name) with a descriptor for the data-attribute values considered (e.g., COVID-19 cases) to generate the name "Global vs. U.S.A. cases." By using the above-mentioned data story properties within the data story template 408 for the dataset groups U.S.A. and Global with the determined data insights for the dataset groups, the visual-data-story system 106 structures and generates the visual data story 412.

As mentioned above, in some instances, the visual-data-story system 106 utilizes dataset groups from data-attribute categories to determine data insights for the visual data stories by utilizing one or more statistical analyses that compare data-attribute values corresponding to one or more dataset groups. To illustrate, in some embodiments, the visual-data-story system 106 defines a data-attribute category as y for a set of data-attribute values $\mathcal{Y}$. For example, in reference to FIG. 4, the visual-data-story system 106 denotes y as a data-attribute category representing "Country" (from the input dataset 402). Then, in reference to FIG. 4, the visual-data-story system 106 represents the set of data-attribute values $\mathcal{Y}$ as the set $\mathcal{Y}$={US, Italy, Brazil, . . . } for the data-attribute category of y.

Furthermore, in some embodiments, the visual-data-story system 106 also determines data-attribute values corresponding to a dataset group as a data-attribute combination X', which is a subset of the input dataset X (e.g., X'⊆X) as a submatrix of the dataset. Given the dataset group X' and a data-attribute category of y, the visual-data-story system 106 defines the dataset group X'($y_i$=a) as the submatrix of data-attribute values (from other data-attribute categories in the same row and/or column where $y_i$=a) that correspond to a∈$\mathcal{Y}$ (e.g., the dataset group value). To illustrate, in reference to FIG. 4, in some embodiments, the visual-data-story system 106 defines the data-attribute category of y as "Country" and $y_i$ as the "Country" of the ith row of the input dataset 402 (e.g., U.S.A.). Then, in one or more instances, the visual-data-story system 106 identifies data attribute values $x_i$ (e.g., 9, 10, . . . , and 5000) as part of the dataset group X' for the dataset group value $y_i$ of "U.S.A."

As further indicated above and shown in FIG. 4, the visual-data-story system 106 determines various types of data insights (in the act 404). In some instances, in accordance with the above-mentioned example of the dataset group X', the visual-data-story system 106 denotes a time series x having data-attribute values $x_i$ from the dataset group X'. Indeed, in one or more embodiments, the visual-data-story system 100 organizes a time series x=($x_1$, $x_2$, . . . , $x_T$) from data-attribute values of the dataset group X'. As an example, in reference to FIG. 4, the time series x includes the data attribute values 9, 10, . . . , and 5000 as part of the dataset group X' for the dataset group value $y_i$ of "USA."

In one or more embodiments, the visual-data-story system 106 utilizes a time series x to determine the various types of data insights (in the act 404). For example, the visual-data-story system 106 utilizes the time series x having ($x_1$, $x_2$, . . . , $x_T$) from data-attribute values of the dataset group X' to derive data values (e.g., derived data values 406a). To illustrate, in some instances, the visual-data-story system 106 determines (or computes) the number of values in the time series x that are greater than a mean value of the data-attribute values of the time series x (e.g., derived data values 406a). For example, the visual-data-story system 106 derives data values that are greater than a mean value of the data-attribute values $x_i$ from the time series x utilizing the following function:

$$f(x)=|\{x_i \in x | x_i > \text{mean}(x)\}| \quad (1)$$

In addition, in some instances, the visual-data-story system 106 determines energy ratios (e.g., energy ratios 406b) from portions of particular data-attribute values organized in a time series x for a particular dataset group. For example, the visual-data-story system 106 determines a k number of portions (or chunks) of data-attribute values from the time series x. Then, the visual-data-story system 106 determines (or calculates) a sum of squares for a portion i out of the k portions (a portion of the data-attribute values). For example, to determine the energy ratio for the portion i out of the k portions, the visual-data-story system 106 expresses the sum of squares for the portion i as a ratio with a sum of squares over the entire time series x. Indeed, in one or more embodiments, the visual-data-story system 106 determines energy ratios for the k portions of a time series x to utilize the energy ratios as data insights for the particular dataset group (e.g., as a highlighted portion).

Furthermore, in one or more embodiments, the visual-data-story system 106 determines linear trends (e.g., linear data trend 406c) as data insights from particular data-attribute values organized in a time series x for a particular dataset group. For example, in some embodiments, the visual-data-story system 106 determines (or computes) a linear least-squares regression for data-attribute values of the time series x versus a sequence from 0 to the length of the time series x minus one. By doing so, in one or more embodiments, the visual-data-story system 106 determines whether the data-attribute values are increasing or decreasing across the sequence as the increasing and/or decreasing linear trend.

In one or more instances, the visual-data-story system 106 determines trends from particular data-attribute values organized in a time series x for a particular dataset group by utilizing a sliding time-window with the time series x. More specifically, in one or more embodiments, the visual-data-story system 106 utilizes a sliding time-window to determine (or compute) a number of data-attribute values in the sliding time-window of the time series x that are higher or lower than a mean value of a previous time-window to determine an increasing and/or decreasing trend.

For example, the visual-data-story system 106 compares a percentage of data-attribute values in a sliding time-window to a mean data-attribute value of a previous time-window to a threshold percentage. When the percentage is greater than the threshold percentage, in some cases, the visual-data-story system 106 determines an increasing trend. Likewise, when the percentage is less than the threshold percentage, in one or more embodiments, the visual-data-story system 106 determines a decreasing trend. In some cases, when the percentage is neither greater nor less than the threshold percentage, the visual-data-story system 106 determines another distribution data insight (e.g., a symmetry test) for the time series x.

As further shown in FIG. 4, in some embodiments, the visual-data-story system 106 determines (as a data insight) a data value extremum or data value minimum (e.g., a data value extremum/minimum 406*d*) from data-attribute values organized in a time series x for a particular dataset group. For example, the visual-data-story system 106 identifies (or computes) the highest data-attribute value of the time series x (e.g., maximum of the time series x) as the data value extremum. Moreover, in some embodiments, the visual-data-story system 106 identifies (or computes) the lowest data-attribute value of the time series x (e.g., a minimum of the time series x) as the data value minimum. Indeed, in one or more embodiments, the visual-data-story system 106 utilizes the data value extremum/minimum from the time series x as a data insight.

As further indicated by FIG. 4, in some embodiments, the visual-data-story system 106 determines (as a data insight) a data distribution (e.g., data distributions 406*e*) from data-attribute values organized in a time series x for a particular dataset group. For example, in one or more embodiments, the visual-data-story system 106 determines and utilizes a distribution of the data-attribute values of a time series x as a data insight. In some instances, the visual-data-story system 106 further analyzes the distribution to determine a data insight. For example, the visual-data-story system 106 utilizes a symmetry test with a distribution of data-attribute values from the time series x to determine whether the distribution is symmetrical (as the data insight).

More specifically, in one or more embodiments, the visual-data-story system 106 utilizes a symmetry test for the time series x based on the median of the time series x compared to a percentage α of a range of the distribution that returns a 1 when the distribution appears symmetric and 0 if the distribution does not appear symmetric. Indeed, in one or more embodiments, the visual-data-story system 106 utilizes a symmetry test for the time series x in accordance with the following function:

$$f(x) = \begin{cases} 1 \text{ if } \left| \sum_i x_i - med(x) \right| < \alpha(\max(x) - \min(x)) \\ 0 \text{ otherwise} \end{cases} \quad (2)$$

As indicated above, in some instances, the visual-data-story system 106 receives a percentage α from a client device as user settings (e.g., user settings 212). In one or more embodiments, the visual-data-story system 106 utilizes the determination of the symmetrical properties of the distribution of the time series x as a data insight.

To illustrate, in some embodiments, the visual-data-story system 106 determines various data insights from an input dataset utilizing various data insight functions described in Table 1 below. Indeed, Table 1 illustrates data insight functions utilized to determine data insights, such as derived data values, energy ratios, linear data trends, data value extremums/minimums, and/or data distributions.

TABLE 1

| Time series Insight Functions | Description |
| --- | --- |
| $f(x) = \|\{x_i \in x \| x_i > \text{mean}(x)\}\|$ | Computes the number of data-attribute values in time series x that are higher than the mean of time series x |
| Energy ratio by k portions | Calculates the sum of squares of portion i out of k chunks expressed as a ratio with the sum of squares over the whole time series x. |
| Linear trend of x | Computes a linear least-squares regression for the values of the time series x versus the sequence from 0 to length of the time series x minus one. |
| Maximum(x) | Computes the highest value of the time series x |
| Minimum(x) | Computes the lowest value of the time series x |
| $f(x) = \begin{cases} 1 \text{ if } \left\| \sum_i x_i - med(x) \right\| < \\ \alpha(\max(x) - \min(x)) \\ 0 \text{ otherwise} \end{cases}$ | Symmetry test of times series x that returns 1 if percent α of the distribution of time series x looks symmetric and 0 otherwise |

In addition (or in the alternative) to the data insights described above, in one or more embodiments, the visual-data-story system 106 determines other various statistical values for the data-attribute values organized in a time series x for a particular dataset group. For example, the visual-data-story system 106 determines (or calculates) statistical values such as, but not limited to, a mean, median, and/or mode of the data-attribute values organized in the time series x for the particular dataset group. Then, in some embodiments, the visual-data-story system 106 utilizes the determined statistical values as data insights for the data-attribute values organized in the time series x for the particular dataset group.

As shown in FIG. 4, upon determining one or more data insights for one or more dataset groups, the visual-data-story system 106 utilizes the data story template 408 to generate the visual data story 412. In particular, in one or more embodiments, the visual-data-story system 106 extracts and generates the data story properties from the data story template 408 and then utilizes a natural language generator (NLG) to generate a natural language summary for the data insights determined from the one or more dataset groups. As mentioned above, in reference to FIG. 4, the visual-data-story system 106 extracts data story properties, such as the data-attribute category name 410*a*, the data-attribute values 410*b*, the dataset group name 410*c*, and the story name 410*f* for the particular one or more dataset groups.

In addition, in one or more embodiments, the visual-data-story system 106 utilizes the determined data insights as the dataset group insights 410*d* (from FIG. 4). Furthermore, in one or more embodiments, the visual-data-story system 106 utilizes the determined data insights (e.g., dataset group insights 410*d*) to determine insight comparisons 410*e* (from FIG. 4) as a data story property. For example, the insight comparisons 410*e* include the visual-data-story system 106 identifying if the dataset group insights are similar (e.g., data insights from two dataset groups are identified as similar if they both include an increasing trend determination). Likewise, the insight comparisons 410e include the visual-data-story system 106 identifying if the dataset group insights are different (e.g., data insights from two dataset groups are identified as different if one data insight identifies significant value changes from derived data values of a first data group whereas another data insight does not identify significant value changes from derived data values of a second data group).

Furthermore, in one more embodiments, the visual-data-story system 106 provides the data-attribute category name 410a, the data-attribute values 410b, the dataset group name 410c, and the story name 410f for the particular dataset groups with the dataset group insights 410d and the insight comparisons 410e to an NLG to generate a natural language summary of a visual data story. For example, the visual-data-story system 106 utilizes the NLG to select transition words based on the insight comparisons 410e. To illustrate, when data insights from two dataset groups are identified as similar (e.g., both having an increasing and/or decreasing trend determination), the visual-data-story system 106 selects "similarly" as a transition word between the two data insights (through the NLG). Likewise, as an example, when data insights from two dataset groups are identified as different (e.g., the two dataset groups having opposing trend determinations), the visual-data-story system 106 selects "to contrast" or "differently" as a transition word between the two data insights (through the NLG). In one or more embodiments, the visual-data-story system 106 utilizes various natural language generators including, but not limited to, Markov chain-based NLGs, recurrent neural network-based NLGs, long short-term memory-based NLGs, and/or self-attention mechanism-based NLGs.

Having determined data story properties as part of a data story template, the visual-data-story system 106 also utilizes the various visual data story properties to generate graphical visualizations and/or animations for the one or more dataset groups (and the corresponding data insights). For example, the visual-data-story system 106 structures the identifies visual data story properties into a graphical visualization structure to generate the visual data story. In one or more embodiments, the visual-data-story system 106 inserts the various visual data story properties into an appropriate structure of a visual data story template (e.g., a title, chart axes, dataset group labels) to generate a visual data story (e.g., with a chart or graph). As part of a video animation, the visual-data-story system 106 also includes natural language summaries, data insights, and/or data insight comparisons when the particular natural language summaries, data insights, and/or data insight comparison is applicable to the graphical visualization for the one or more dataset groups.

As shown in FIG. 4, in some embodiments, the visual-data-story system 106 determines multiple data insights to compare two dataset groups (e.g., different dataset groups) and further generates visual data stories that reflect the multiple data insights. By contrast, in one or more embodiments, the visual-data-story system 106 determines data insights and generates a visual data story for a singular dataset group. Although one or more embodiments herein describe the visual-data-story system 106 generating visual data stories for one or two data insights (for one or two dataset groups), the visual-data-story system 106, in some instances, determines various numbers of data insights for various numbers of dataset groups to generate visual data stories. Furthermore, in some embodiments, the visual-data-story system 106 determines data insights and generates visual data stories for a variety of data-attribute values and data-attribute categories and dataset groups within those data-attribute categories.

In some embodiments, the visual-data-story system 106 determines data insights and generates visual data stories for a variety of data-attribute categories and dataset groups utilizing an order of actions, as outlined in the following pseudo-code of Table 2.

TABLE 2

Procedure Timeseries_Insight_Generation(X');
while all y denote a data-attribute category where $\mathcal{Y}$ is the set of k = $|\mathcal{Y}|$
   do generate_visualization(X'(y));
   if the percentage of $x_i \in$ X'(y) that are higher than previous sliding window
      > threshold percentage then
      NLG(y, x, IncreasingTrend);
   else
     if the percentage of $x_i \in$ X'(y) that are higher than previous sliding window
        < threshold percentage then
        NLG(y, x, DecreasingTrend);
     else
       determine data distribution insights;
     end
   end
   set TimeseriesSegmentInsight = Energy Ratio by k portions over X'(y);
   generate_visualization(TimeseriesSegmentInsight);
   NLG(y, x, TimeseriesSegmentInsight);
end For example, in reference to Table 2, for a dataset group X' from a data-attribute category y, the visual-data-story system 106 first generates a graphical visualization of the data-attribute values that correspond to the dataset group X'(y). Then, in one or more embodiments, the visual-data-story system 106 determines whether the data-attribute values corresponding to the dataset group X'(y) are experiencing an increasing trend or a decreasing trend over a time series (e.g., in accordance with one or more embodiments).

In further reference to Table 2, upon determining that the data-attribute values corresponding to the dataset group X'(y) are experiencing an increasing and/or decreasing trend, in some embodiments, the visual-data-story system 106 utilizes a natural language generation (e.g., NLG) to generate an increasing and/or decreasing trend summary for the dataset group X'(y). In some instances, if the data-attribute values corresponding to the dataset group X'(y) is not experiencing an increasing and/or decreasing trend, the visual-data-story system 106 determines other trends (e.g., a data distribution trend as described above) for the dataset group X'(y).

In addition to detecting and summarizing such data trends, in some embodiments (in reference to Table 2), the visual-data-story system 106 also determines a time series segment insight. More specifically, as described above, in some instances, the visual-data-story system 106 determines energy ratios of k portions (or segments) of the data-attribute values corresponding to the dataset group X'(y) (e.g., TimeseriesSegmentInsights). The visual-data-story system 106 utilizes the energy ratios of the portions (or segments) to generate a visualization of a particular segment within the time series (e.g., as shown in FIG. 8) and also a natural language summary using the energy ratios of the portions (or segments).

Although Table 2 illustrates a specific order of actions, in some embodiments, the visual-data-story system 106 determines a variety of data insights and generates visual data stories for a variety of dataset groups. For example, the visual-data-story system 106 utilizes a similar order of actions to determine other data insights (e.g., derived values, data value extremums, data value minimums) and generates visual data stories for those data insights. By doing so, in one or more embodiments, the visual-data-story system 106 generates a number of visual data stories from an input dataset (e.g., the input dataset 402).

Figure 5:
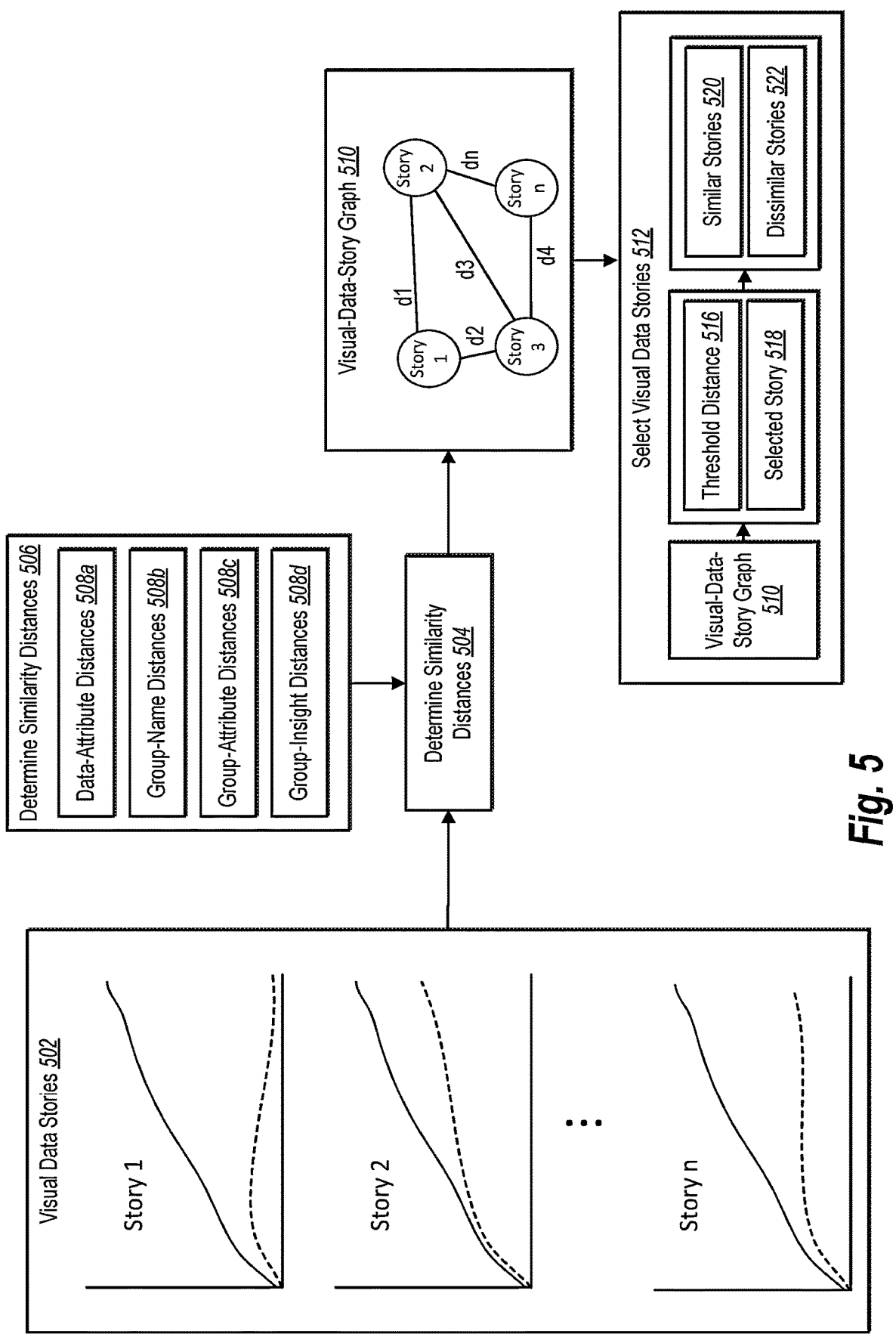
FIG. 5 illustrates a visual-data-story system generating a visual-data-story graph in accordance with one or more embodiments.

As also mentioned above, in some embodiments, the visual-data-story system 106 generates a visual-data-story graph. For example, FIG. 5 illustrates the visual-data-story system 106 determining similarity distances between data-story properties of visual-data-story pairs from visual data stories to generate a visual-data-story graph. As shown in FIG. 5, the visual-data-story system 106 identifies visual data stories 502 and determines similarity distances in an act 504 for various combinations (e.g., visual-data-story pairs) of the visual data stories 502. For example, as illustrated in FIG. 5, the visual-data-story system 106 determines a variety of similarity distances 506 between data-story properties, which include data-attribute distances 508a, group-name distances 508b, group-attribute distances 508c, and group-insight distances 508d.

In particular, as shown in FIG. 5, the visual-data-story system 106 utilizes various combinations of the similarity distances 506 to generate a visual-data-story graph 510. The visual-data-story graph 510 includes the visual data stories 502 as nodes that are connected by edges that represent similarity distances ($d_n$) determined between various combinations (e.g., visual-data-story pairs) of the visual data stories 502. Although FIG. 5 illustrates edges between some of the nodes of the visual data stories 502 in the visual-data-story graph 510, in some instances, the visual-data-story system 106 determines edges (as similarity distances and/or scores) between a variety of combinations of the generated visual data stories within a visual-data-story graph. Although FIG. 5 illustrates the visual-data-story graph 510 having similarity distances between visual data stories, in one or more embodiments, the visual-data-story system 106 utilizes the similarity distances to generate a similarity score between visual data stories (e.g., as described below in relation to functions 9 and 10).

As further illustrated in FIG. 5, the visual-data-story system 106 selects visual data stories in an act 512 from the visual-data-story graph 510. In particular, as shown in FIG. 5, the visual-data-story system 106 utilizes a threshold distance 516 with a selected story 518 (e.g., an initial visual data story) to select visual data stories from the visual-data-story graph 510. In one or more instances, the selected story 518 includes a visual data story that is initially presented within a graphical user interface by the visual-data-story system 106. For example, the visual-data-story system 106 displays one or more initial visual data stories within a graphical user interface (e.g., a visual-data-story-home panel). Indeed, in some instances, the visual-data-story system 106 displays the initial visual data stories based on similarity distances within a visual-data-story graph, user settings, and/or in relation to an overarching dataset group.

To illustrate, in some instances, the visual-data-story system 106 displays an initial visual data story within a graphical user interface (e.g., the visual-data-story-home panel) by surfacing a visual data story represented by the visual-data-story graph that belongs to pairings with the lowest similarity distances (e.g., from visual-data-story pairs that are most similar by meeting a similarity distance threshold). In some embodiments, the visual-data-story system 106 displays an initial visual data story by filtering (e.g., as described in relation to FIG. 2) and surfacing an initial visual data story from the visual-data-story graph using a user setting indicated filter for a particular data-attribute category and/or dataset group (e.g., filtering visual data stories that relate to the U.S.). Moreover, in some instances, the visual-data-story system 106 displays one or more initial visual data stories by displaying a visual data story that corresponds to an overarching (or largest) dataset group (e.g., surfacing visual data stories that correspond to the overarching dataset group of Global as it includes each dataset group in the data-attribute category of Country). Indeed, in one or more embodiments, the visual-data-story system 106 receives a selection of a visual data story (e.g., selected story 518) from one or more initial visual data stories displayed within the visual-data-story-home panel graphical user interface.

Then, the visual-data-story system 106 identifies and selects visual data stories from the visual-data-story graph 510 that are within the threshold distance 516 from the selected story 518 as similar stories 520. Furthermore, the visual-data-story system 106 identifies and selects visual data stories from the visual-data-story graph 510 that are more than the threshold distance 516 from the selected story 518 as dissimilar stories 522. In some cases, the visual-data-story system 106 identifies and selects the dissimilar stories 522 as the visual data stories that are at least a predefined number (e.g., 1 times, 1.5 times, 2 times) the threshold distance 516 away from the selected story 518. In some embodiments, the visual-data-story system 106 utilizes the similar stories 520 and the dissimilar stories 522 as visual data story recommendations.

Although FIG. 5 illustrates the visual-data-story system 106 utilizing threshold distance 516, in one or more embodiments, the visual-data-story system 106 utilizes a threshold similarity score when the edges of the visual-data-story graph 510 are converted to similarity scores using the corresponding similarity distances (e.g., as described below in relation to functions 9 and 10). Furthermore, in one or more embodiments, the visual-data-story system 106 identifies (or receives) a threshold distance and/or threshold similarity score from user settings (e.g., as described in FIG. 2). Additionally, in one or more embodiments, a similarity distance (or distance) includes one or more values that represent a quantification of similarity between two elements (e.g., data insights, visual data stories, visual data story properties). For example, a similarity distance includes a numerical value (e.g., as a vector value, a real number, or a normalized value) that measures similarity in terms of space between the two elements.

As suggested above, in one or more embodiments, the visual-data-story system 106 utilizes a data story distance function that derives similarity distances between visual-data-story pairs by using various data-story properties of the visual-data-story pairs from the visual data stories. In some instances, the visual-data-story system 106 utilizes data-story properties, such as, but not limited to, data attributes of a visual data story, a dataset group name of a visual data story, grouping attribute of a visual data story, and/or a group insight of a visual data story (e.g., as shown in FIG. 4). Furthermore, in some embodiments, the visual-data-story system 106 utilizes the data story distance function to combine various distances determined from the data-story properties to determine a similarity distance. In addition (or in the alternative) to the data-story properties shown in FIG. 4, the visual-data-story system 106 can utilize a variety of other data-story properties as part of the similarity distances.

To illustrate, in one or more instances, the visual-data-story system 106 determines a data-attribute distance between a pair of visual data stories. In particular, in one or more embodiments, the visual-data-story system 106 compares the data-attribute values that are within the pair of visual data stories to determine a data-attribute distance between the pair of visual data stories. For example, the visual-data-story system 106 identifies a first set of data-attribute values $S_i$ for a first visual data story i and a second set of data-attribute values $S_j$ for a second visual data story j. Then, in one or more embodiments, the visual-data-story system 106 determines a data-attribute distance $d_{da}$ (e.g., as an intersection distance) using the first set of data-attribute values $S_i$ and the second set of data-attribute values $S_j$ by comparing the data-attribute values within the two sets using the following function:

$$d_{da}(S_i, S_j) = \max(|S_i|, |S_j|) - |S_i \cap S_j| \quad (3)$$

In some instances, the visual-data-story system 106 utilizes the above mentioned function (e.g., function (3)) to utilize a binary encoding to represent data-attribute values of a dataset as a vector in which each visual data story has a vector (e.g., set of data-attribute values) that has a value of 1 when the data-attribute value is utilized in the dataset group associated with the visual data story vector (and a value of 0 otherwise).

As an example, the visual-data-story system 106 determines that the first set of data-attribute values $S_i$ includes data-attribute values A and B (e.g., $S_i=\{A,B\}$) and that the second set of data-attribute values $S_j$ includes data-attribute values B and C (e.g., $S_j=\{B,C\}$). Then, the visual-data-story system 106 determines a data-attribute distance $d_{da}(S_i,S_j)$ of 2 between the visual data stories i and j when $S_i=\{A, B\}$ and $S_j=\{B,C\}$.

Furthermore, in some embodiments, the visual-data-story system 106 determines a group-name distance (e.g., a group name difference) between a pair of visual data stories. In particular, in some embodiments, the visual-data-story system 106 determines a distance between the dataset group names utilized for the pair of visual data stories. For example, the visual-data-story system 106 identifies a first set of dataset group names (or subgroup names) $N_i$ for a first visual data story i and a second set of dataset group names (or subgroup names) $N_j$ for a second visual data story j. Then, in one or more embodiments, the visual-data-story system 106 determines a group-name distance $d_{gn}$ between the first set of dataset group names $N_i$ and the second set of dataset group names $N_j$ using the following function:

$$d_{gn}(N_i, N_j) = \max(|N_i|, |N_j|) - |N_i \cap N_j| \quad (4)$$

As an example, when $N_i=\{\text{Global, US}\}$ and $N_j=\{\text{Global, China}\}$, the visual-data-story system 106 determines a group-name distance $d_{gn}(N_i,N_j)$ of 1 between the visual data stories i and j. In one or more embodiments, the visual-data-story system 106 determines a group-name distance of 0 and adds a distance of 1 for each difference identified between the visual data stories i and j. In some instances, the visual-data-story system 106 utilizes a group-name distance value of 2 when a group-name distance of 0 is not identified between two visual data stories.

In addition (or in the alternative) to the above similarity distances, in one or more embodiments, the visual-data-story system 106 determines a group-attribute distance (e.g., a group dimension distance) between a pair of visual data stories. More specifically, in one or more instances, the visual-data-story system 106 determines a distance between data-attribute categories that correspond to one or more dataset groups associated with the pair of visual data stories (e.g., attributes from the dataset used to select the dataset groups and/or the group of data-attribute values for the dataset groups). For instance, the visual-data-story system 106 identifies a first set of group attributes $Y_i$ for a first visual data story i and a second set of group attributes $Y_j$ for a second visual data story j. Subsequently, the visual-data-story system 106 determines a group-attribute distance $d_{gd}$ (e.g., as an intersection distance) between the first set of group attributes $Y_i$ and the second set of group attributes $Y_j$ (e.g., as vectors) using the following function:

$$d_{gd}(Y_i, Y_j) = \max(|Y_i|, |Y_j|) - |Y_i \cap Y_j| \quad (5)$$

To illustrate, in one or more embodiments, when the first set of group attributes $Y_i=\{\text{city}\}$ and the second set of group attributes $Y_j=\{\text{country}\}$, the visual-data-story system 106 determines a group-attribute distance $d_{gd}(Y_i,Y_j)$ of 1 between the visual data stories i and j. In some embodiments, the visual-data-story system 106 utilizes the above-mentioned function (5) for group-attribute distances $d_{gd}(Y_i, Y_j)$ to find exact matches between group attributes. In one or more additional embodiments, the visual-data-story system 106 utilizes a group-attribute distance function that granularly measures an edit distance between actual group attributes of data visual story pairs.

In addition (or in the alternative) to the above similarity distances, in some embodiments, the visual-data-story system 106 determines a group-insight distance (e.g., a group insight list difference) between a pair of visual data stories. In particular, in some embodiments, the visual-data-story system 106 determines a distance between sets of group insights from a pair of visual data stories. For example, for a first set of group insights $L_i$ from a first visual data story i and a second set of group insights $I_j$ from a second visual data story j, the visual-data-story system 106 determines a group-insight distance $d_{gi}$ using the following function:

$$d_{gi}(I_i, I_j) = \max(|I_i|, |I_j|) - |I_i \cap I_j| \quad (6)$$

In some instances, the visual-data-story system 106 utilizes $|I_i|$ as a cardinality of the first set of group insights $I_i$ and utilizes $|I_j|$ as a cardinality for the second set of group insights $I_j$. As an example, in one or more embodiments, when the first set of group insights $I_i=\{\text{increasing,segment 1}\}$ and the second set of group insights $I_j=\{\text{increasing, segment 4}\}$, then the visual-data-story system 106 determines a group-insight distance $d_{gi}(I_i,I_j)$ of 1 because $|I_i|=|I_j|=2$ and $|I_i \cap I_j|=1$ due to $I_i \cap I_j=\{\text{increasing}\}$.

In one or more embodiments, the visual-data-story system 106 determines a group-insight distance of 0 and adds a distance of 1 for each difference identified between the visual data stories i and j. In some instances, the visual-data-story system 106 utilizes a group-insight distance value of 2 when a group-insight distance of 0 is not identified between two visual data stories.

As mentioned above, in one or more embodiments, the visual-data-story system 106 utilizes a data story distance function (e.g., as described in function (7) below) to combine data-attribute distances, group-name distances, group-attribute distances, and group-insight distances determined from the data-story properties (as described above in functions (3)-(6)) to determine a type of aggregate similarity distance. In particular, in one or more embodiments, the visual-data-story system 106 determines an aggregate pair-wise distance between visual data stories as the similarity distance between the visual data stories. For example, the visual-data-story system 106 combines (e.g., using a linear combination) the determined (or computed) data-attribute distance, group-name distance, group-attribute distance, and group-insight distance (determined as described above in functions (3)-(6)) to obtain an overall distance (or similarity distance) between the visual data story pairing. Then, in some embodiments, the visual-data-story system 106 normalizes the overall distance along a [0,1] scale to obtain a final similarity distance for the visual data story pairing.

To illustrate, in one or more embodiments, the visual-data-story system 106 utilizes a set $\mathcal{S}$ of n automatically generated visual data stories. Then, in some embodiments, given a set D of data story distance functions (e.g., D={$d_{da}$, $d_{gd}$, $d_{gn}$, $d_{gi}$} to represent the data-attribute distances, the group-attribute distances, the group-name distances, and the group-insight distances as described above in functions (3)-(6)), the visual-data-story system 106 determines similarity distances D(i,j) between pairs of visual data stories i and j (e.g., as aggregate pairwise distances) using the following function:

$$D(i, j) = \sum_{d \in D} d(i, j), \forall i, j \quad (7)$$

$$j = d_{da}(i, j) + d_{gd}(i, j) + d_{gn}(i, j) + d_{gi}(i, j), \forall i, j$$

Furthermore, in one or more embodiments, the visual-data-story system 106 normalizes the aggregate pairwise distances between pairs of visual data stories i and j. In particular, in some embodiments, the visual-data-story system 106 normalizes a pairwise visual data story distance matrix $D \in \mathbb{R}^{n \times n} \to \mathbb{R}^{n \times n}$ (e.g., a distance matrix having the similarity distances D(i,j) as described above in function (7)) by scaling values of the distance matrix to be between [0, 1] using a normalization function. For example, the visual-data-story system 106 utilizes the following normalization function:

$$g: \mathbb{R}^{n \times n} \to \mathbb{R}^{n \times n} \text{ such that } 0 \leq D_{ij} \leq, \forall i,j \quad (8)$$

Indeed, in the above normalization function, in one or more embodiments, g represents a min-max scaling function that maps the maximum D(i,j) from the distance matrix D (e.g., max(D)) to 1 and the minimum D(i,j) from the distance matrix D (e.g., min(D)) to 0. By doing so, the visual-data-story system 106 generates distances D(i,j) between pairs of visual data stories i, j that are normalized to be between [0,1]. Indeed, in one or more embodiments, the visual-data-story system 106 utilizes the (non-normalized and/or normalized) distances D(i,j) (e.g., from functions (7) and/or (8)) as the similarity distances in a visual-data-story graph.

In certain instances, the visual-data-story system 106 further determines a similarity score between visual data story pairs from a similarity distance (e.g., various similarity distances as described above in relation to functions (3)-(8)). In particular, in one or more embodiments, the visual-data-story system 106 utilizes similarity distances (e.g., as described above in relation to functions (3)-(8)) to generate a visual data story similarity score matrix $S \in \mathbb{R}^{n \times n}$ in accordance with the following function:

$$S=(1-D_{ij}, \forall i,j \in [n] \quad (9)$$

Indeed, in one or more embodiments, the visual data story similarity score matrix S includes similarity scores $S_{ij}$ that correspond to a pair of visual data stories i and j. For example, the visual-data-story system 106 determines the similarity scores $S_{ij}$ utilizing similarity distances $D_{ij}$ using the following function:

$$S_{ij}=1-D_{ij} \quad (10)$$

In one or more embodiments, the visual-data-story system 106 identifies larger values of the similarity scores $S_{ij}$ as indicating a greater similarity between a pair of visual data stories i and j. Indeed, in certain instances, the visual-data-story system 106 utilizes similarity scores $S_{ij}$ that increase in value as similarity distances decrease and decrease in value when similarity distances increase for a pair of visual data stories. In some embodiments, the visual-data-story system 106 utilizes the similarity scores $S_{ij}$ as presentable indicators, to users on a graphical user interface, of the similarity of a visual data story and/or to determine whether to create an edge between nodes of the visual data stories (in a visual-data-story graph). For example, in some cases, when the similarity score $S_{ij}$ is non-positive (e.g., $S_{ij} \leq 0$), the visual-data-story system 106 does not create an edge between the nodes of the visual data stories i and j within a visual-data-story graph.

As shown in FIG. 5, upon determining the similarity distances in the act 504 (e.g., in accordance with functions (3)-(10) above), the visual-data-story system 106 generates the visual-data-story graph 510. Indeed, as mentioned above, in some instances, the visual-data-story system 106 generates a visual-data-story graph that includes visual data stories as nodes that are connected by edges that represent similarity distances (and/or scores) between the visual data story nodes. For instance, the visual-data-story system 106 generates a visual-data-story graph G=(V, E, S), where V constitutes the nodes representing auto-generated visual data stories, E constitutes the set of edges representing pairwise similarities between visual data stories, and S constitutes the visual data story similarity score matrix based on similarity distances (e.g., as described above in relation to functions 9 and 10).

In some embodiments, the visual-data-story system 106 includes an edge in the set E for positive pairwise similarities between visual data stories. For instance, the visual-data-story system 106 includes an edge (i,e)∈E with weight between visual data story i and visual data story j if a similarity score $S_{ij}$ (e.g., as described in relation to functions (9) and (10)) is positive (e.g., $S_{ij}$>0). Accordingly, in some embodiments, the visual-data-story system 106 does not generate a relationship (e.g., an edge) in the visual-data-story graph G for a pair of visual data stories from the set of visual data stories $\mathcal{S}$ with a similarity score of 0 (e.g., min(S)=0). Indeed, in one or more instances, the visual-data-story system 106 defines the set of edges E such that E=$\mathcal{S} \times \mathcal{S}$ \E or $\overline{E} \cup E = \mathcal{S} \times \mathcal{S}$. Although one or more embodiments illustrate edges of the visual-data-story graph having similarity scores, in some cases, the visual-data-story system 106 utilizes any combination of similarity distances (e.g., as described in relation to functions (3)-(8)) for the edges of the visual-data-story graph.

Figure 6:
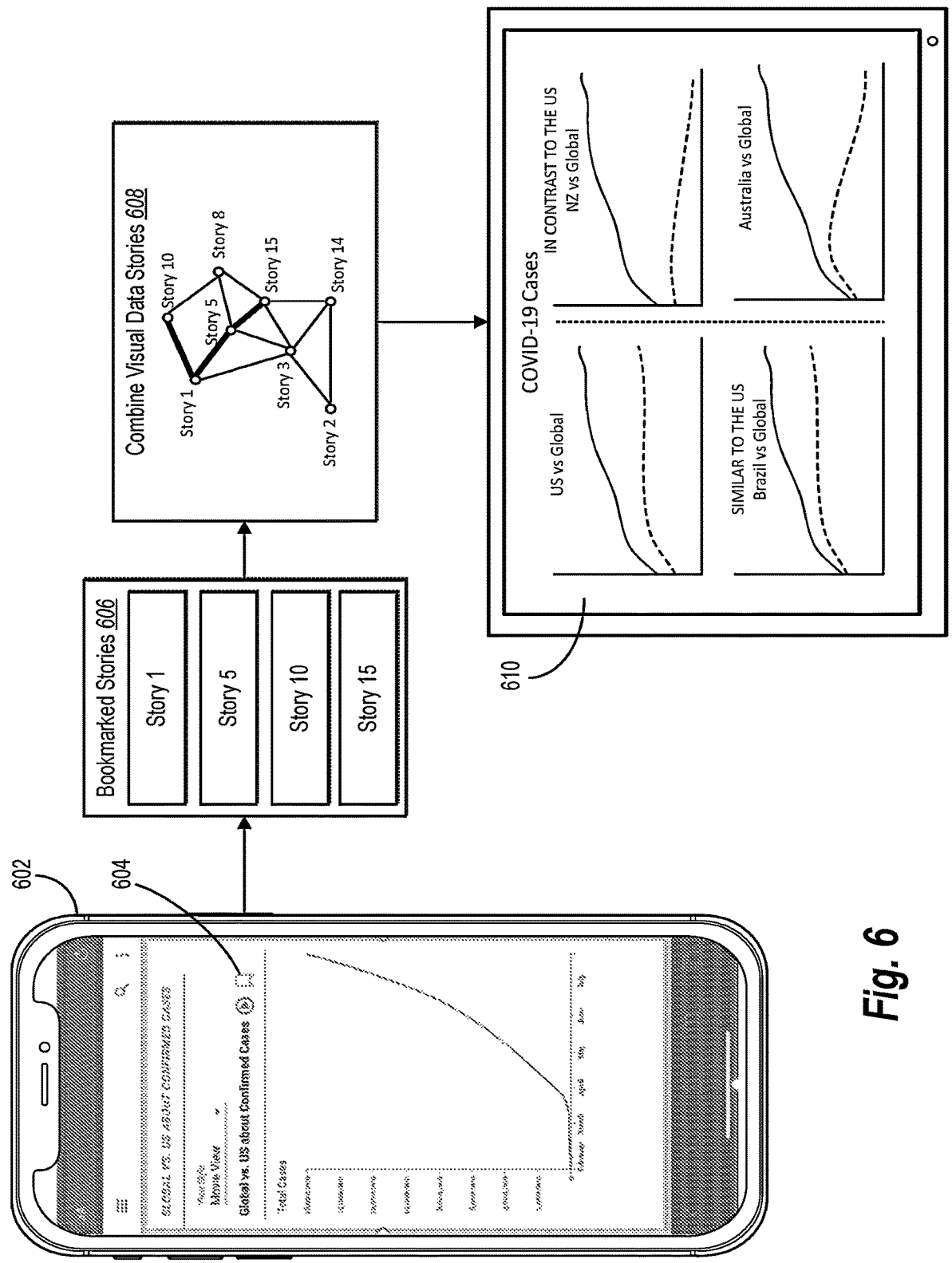
FIG. 6 illustrates a visual-data-story system generating a stitched-visual-data story from visual data stories bookmarked by a user in accordance with one or more embodiments.

As mentioned above, in one or more embodiments, the visual-data-story system 106 provides selectable options to select (e.g., bookmark) visual data stories and to combine (e.g., stitch) the selected visual data stories. For example, FIG. 6 illustrates the visual-data-story system 106 combining selected visual data stories into a larger, coherent visual data story. As shown in FIG. 6, the visual-data-story system 106 provides, for display within a graphical user interface of a client device 602, a selectable option 604 to bookmark (or select) a visual data story. In particular, as shown in FIG. 6, upon receiving an indication of a user interaction with the selectable option 604, the visual-data-story system 106 includes the selected visual data story (e.g., the visual data story corresponding to the selectable option 604) within bookmarked stories 606.

Indeed, the visual-data-story system 106, as shown in FIG. 6, generates a set of bookmarked-visual-data stories (e.g., story 1, story 5, story 10, and story 15) as the bookmarked stories 606 upon receiving an indication of user interactions with selectable options to bookmark (or select) the visual data stories within the bookmarked stories 606. In one or more embodiments, the visual-data-story system 106 receives requests to bookmark a variety of visual data stories. Moreover, in some embodiments, the visual-data-story system 106 provides, for display within a graphical user interface, a selectable option to bookmark a visual data story within each visual data story.

Furthermore, as illustrated in FIG. 6, the visual-data-story system 106 also combines visual data stories in an act 608. For example, the visual-data-story system 106 receives an indication of a user selection (from the client device 602) to combine (or stitch) the set of bookmarked-visual-data stories (from the bookmarked stories 606). In some instances, the visual-data-story system 106 provides, for display within the graphical user interface of the client device 602, a selectable option to stitch (or combine) bookmarked (or selected) visual data stories. As shown in FIG. 6, upon receiving a request to stitch the bookmarked-visual-data stories, the visual-data-story system 106 combines visual data stories from the bookmarked stories 606 in the act 608 to generate a stitched-visual-data story 610 (e.g., a larger, coherent visual data story). For example, as shown in FIG. 6, the stitched-visual-data story 610 generated from stitching bookmarked stories 606 results in a visual data story that represents multiple data insights as a presentable report that is exportable to a preferred file format (e.g., on the client device 602).

In some embodiments, the visual-data-story system 106 combines (or stitches) bookmarked (or selected) visual data stories such that the visual data stories transition naturally and avoid overlapping data insights. For example, the visual-data-story system 106 combines visual data stories by utilizing a similarity distance (or similarity score) between each pairing of the bookmarked-visual-data stories to determine an order of the bookmarked-visual-data stories. Then, in certain instances, the visual-data-story system 106 utilizes the determined order to combine the bookmarked visual data stories into a stitched-visual-data story (e.g., a single coherent visual data story) that represents the data insights illustrated within the set of bookmarked-visual-data stories.

Furthermore, in one or more embodiments, the visual-data-story system 106 utilizes a minimum spanning tree algorithm to combine (or stitch) bookmarked-visual-data stories to generate a stitched-visual-data story. For example, the visual-data-story system 106 generates a visual-data-story subgraph having a set of edges that exist between nodes of the set of bookmarked-visual-data stories. Then, in some embodiments, the visual-data-story system 106 identifies a minimum spanning tree that connects the nodes of the set of bookmarked-visual-data stories and utilizes the minimum spanning tree to sequence the bookmarked-visual-data stories in an order determined by traversing the minimum spanning tree of the nodes of the set of bookmarked-visual-data stories in the visual-data-story subgraph. Indeed, in some instances, the visual-data-story system 106 utilizes the sequenced order of the bookmarked-visual-data stories to generate the stitched-visual-data story.

To illustrate, in certain instances, the visual-data-story system 106 utilizes a subset of bookmarked-visual-data stories W from the set of visual data story nodes V from the visual-data-story graph G (e.g., W⊆V) to generate, from the visual-data-story graph G, a visual-data-story subgraph H=(W, E[W]) that includes a subset of edges E[W] from the set of edges E that exist between the nodes corresponding to the subset of bookmarked-visual-data stories W (e.g., E[W] ⊆E). Then, in some embodiments, from the visual-data-story subgraph H, the visual-data-story system 106 identifies a minimum spanning tree T that connects the subset of bookmarked-visual-data stories W. In certain instances, the visual-data-story system 106 traverses the minimum spanning tree T using a depth-first-search and/or short branch first approach to determine a sequence of order for the bookmarked-visual-data stories (e.g., to generate the stitched-visual-data story).

For example, the visual-data-story system 106 utilizes a first bookmarked visual data story as a root node of the minimum spanning tree T and utilizes the depth-first-search and/or a short branch first approach to generate a sequence of visual data stories beginning from the root node. Then, in one or more embodiments, the visual-data-story system 106 utilizes the sequence of visual data stories to generate a stitched-visual-data story that follows the sequence. In some instances, the visual-data-story system 106 receives a selection (or reselection) of a root node for the stitched-visual-data story and generates (or regenerates) the sequence of the bookmarked-visual-data stories based on determining a minimum spanning tree based on the new root node.

To illustrate, in one or more embodiments, upon identifying five bookmarked-visual-data stories (e.g., Global vs. U.S., U.S. vs. Brazil, U.S. vs. China, China vs. Italy, and China vs. Australia), the visual-data-story system 106 generates a visual-data-story subgraph and similarity distances of edges between pairs of the five bookmarked-visual-data stories as shown in Table 3 below.

TABLE 3

|  | Global vs. U.S. | U.S. vs. Brazil | U.S. vs. China | China vs. Italy | China vs. Australia |
| --- | --- | --- | --- | --- | --- |
| Global vs. U.S. | INFINITY | 2 | 3 | 4 | 3 |
| U.S. vs. Brazil | 2 | INFINITY | 2 | 4 | 3 |
| U.S. vs. China | 3 | 2 | INFINITY | 4 | 4 |
| China vs. Italy | 4 | 4 | 4 | INFINITY | 2 |
| China vs. Australia | 3 | 3 | 4 | 2 | INFINITY |

Then, in one or more embodiments, the visual-data-story system 106 generates a minimum spanning tree for the above-mentioned five bookmarked-visual-data stories in which the Global vs. U.S. visual data story includes two branches (e.g., one branch for the U.S. vs. Brazil visual data story and one branch for the China vs. Australia visual data story), the U.S. vs. Brazil visual data story further branches to the U.S. vs. China visual data story, and the China vs. Australia visual data story further branches to the China vs. Italy visual data story. Moreover, in one or more embodiments, the visual-data-story system 106 utilizes the above-mentioned minimum spanning tree for the five bookmarked-visual-data stories to generate a visual-data-story that follows the minimum spanning tree order.

In one or more embodiments, the visual-data-story system 106 also provides one or more transitions (and removes overlapped data insights) from the above mentioned five bookmarked-visual-data stories (after generating the ordered minimum spanning tree) to generate the following natural language summary:

The number of number of COVID-19 confirmed cases for Global is increasing. In detail, dividing the time series into 4 time segments, the number of COVID-19 confirmed cases for Global increases the fastest in the time segment 4. Similarly, the number of COVID-19 confirmed cases for the U.S. is increasing. And dividing the time series into 4 time segments, the number of COVID-19 confirmed cases for the U.S. increases the fastest in the time segment 4. The comparison between the U.S. and Brazil is similar. The number of COVID-19 confirmed cases for Brazil is increasing. And dividing the time series into 4 time segments, the number of COVID-19 confirmed cases for Brazil increases the fastest in the time segment 4. However, the comparison between the U.S. and China is different. Although the number of COVID-19 confirmed cases for China is increasing. But dividing the time series into 4 time segments, the number of COVID-19 confirmed cases for China increases the fastest in the time segment 1. Compared to the comparison between Global and the U.S., the comparison between China and Australia is a different story. The number of COVID-19 confirmed cases for China is increasing. In detail, dividing the time series into 4 time segments, the number of COVID-19 confirmed cases for China increases the fastest in the time segment 1. Although the number of COVID-19 confirmed cases for Australia is increasing. But dividing the time series into 4 time segments, the number of COVID-19 confirmed cases for Australia increases the fastest in the time segment 4. The comparison between China and Italy is also different. Although the number of COVID-19 confirmed cases for Italy is increasing. But dividing the time series into 4 time segments, the number of COVID-19 confirmed cases for Italy increases the fastest in the time segment 2.

Furthermore, in one or more embodiments, the visual-data-story system 106 provides options, within a graphical user interface, to modify a stitched-visual-data story. For example, the visual-data-story system 106 provides interactive options, within a graphical user interface, to modify the visual appearance of the stitched-visual-data story (or a visual data story). In some instances, the visual-data-story system 106 provides interactive options, within a graphical user interface, to reorganize visual data stories within the stitched-visual-data story to reorganize the order and/or placement of the visual data stories. In addition, in one or more embodiments, the visual-data-story system 106 provides interactive options, within a graphical user interface, to modify content (e.g., text and/or visual) of visual data stories or visual data story natural language summaries. Moreover, as described above in relation to FIG. 2, the visual-data-story system 106 generates (or outputs) the finalized stitched-visual-data story as an exportable file in various formats within a graphical user interface, video (e.g., a video file), website, and/or other digital content (e.g., a PDF, infographic posters, or another exportable file).

Figure 7:
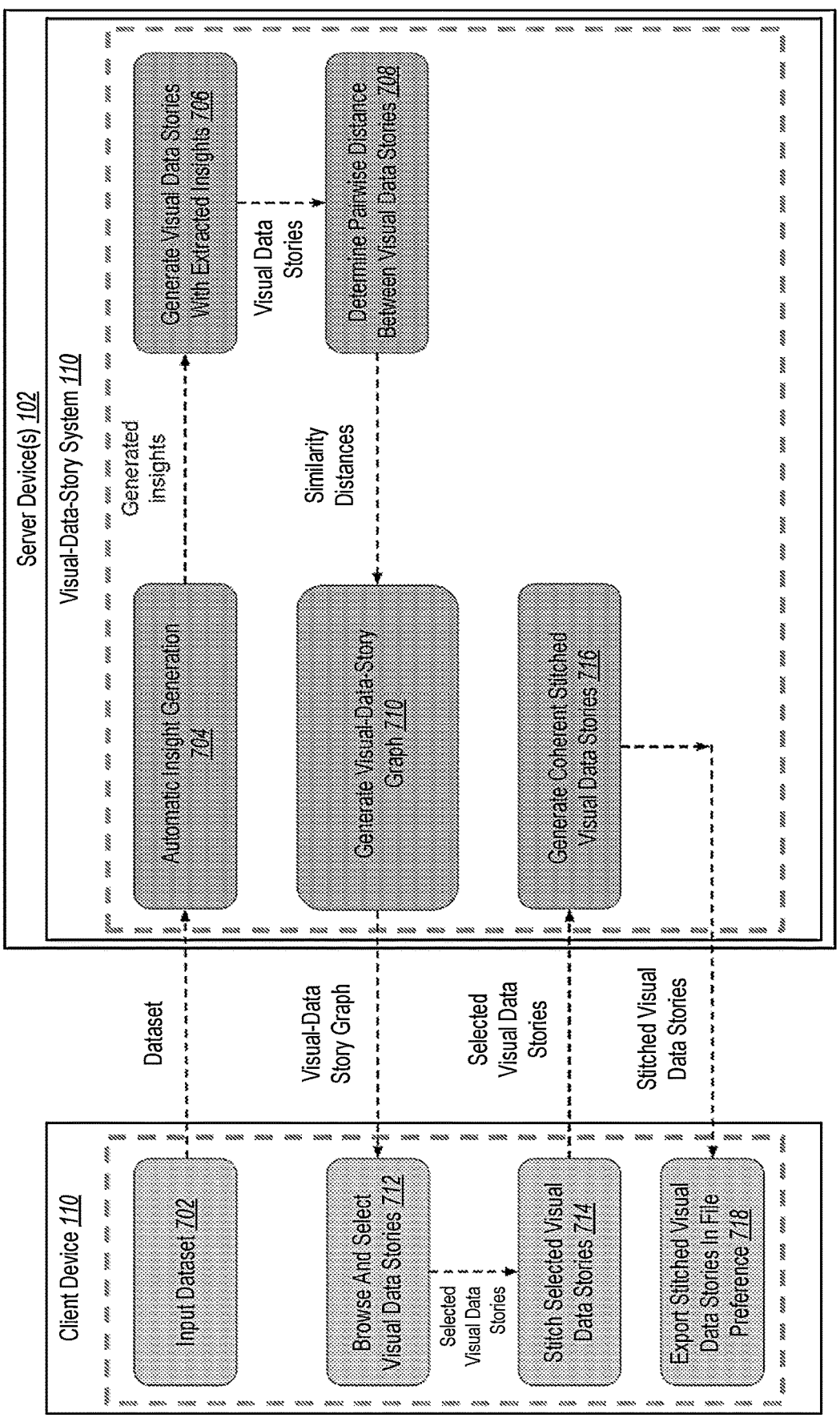
FIG. 7 illustrates an overview of interactions between a client device and server devices when a visual-data-story system generates a visual data story in accordance with one or more embodiments.

In one or more embodiments, the visual-data-story system 106 is hosted on server device(s) and interacts with a client device to generate a visual data story (or a stitched-visual-data story). For example, FIG. 7 illustrates a front-end client device and back end server device flow of the visual-data-story system 106 generating a visual data story in accordance with one or more embodiments. As shown in FIG. 7, the visual-data-story system 106 receives an input dataset 702 on the client device 110 which is sent to the server device(s) 102. Then, as shown in FIG. 7, the visual-data-story system 106 utilizes the dataset for automatic data insight generation in an act 704. Furthermore, as shown in FIG. 7, the visual-data-story system 106 utilizes the generated (or determined) data insights from the input datasets to generate visual data stories with the extracted data insights in an act 706.

As further illustrated in FIG. 7, the visual-data-story system 106 utilizes the visual data stories to determine a pairwise distance (e.g., similarity distances) between the generated visual data stories in the act 708. Indeed, as further shown in FIG. 7, the similarity distances are utilized to generate a visual-data-story graph in the act 710. Additionally, the visual-data-story system 106 provides the visual-data-story graph to the client device 110. By providing such a graph, the visual-data-story system 106 provides a map or guide for the client device 110 to navigate visual data stories based on the visual-data-story graph. Accordingly, before or as part of such navigation, the visual-data-story system 106 data for the underlying visual data stories for display on the client device 110. As further illustrated in FIG. 7, the visual-data-story system 106 receives selected visual data stories from the client device 110 after detecting browsing and selecting of the visual data stories in an act 712 and a request to stitch the selected visual data stories in an act 714.

Moreover, as shown in FIG. 7, upon receiving the selected visual data stories (e.g., bookmarked-visual-data stories), the visual-data-story system 106 generates a coherent stitched-visual-data story in an act 716. In addition, as illustrated in FIG. 7, the visual-data-story system 106 provides the stitched-visual-data story to the client device 110 such that the client device 110 is capable of exporting the stitched-visual-data stories in a selected file preference (in an act 718). In some instances, the visual-data-story system 106 can implement the acts illustrated in FIG. 7 in the order shown or in a different order and/or in a different combination.

As mentioned above, in some embodiments, the visual-data-story system 106 provides, for display within a graphical user interface, a visual data story as an animated video. For example, FIGS. 8A-8E illustrate the visual-data-story system 106 displaying a visual data story as a sequence of graphical visualizations and natural language summaries (within an animated video).

Figure 8A:
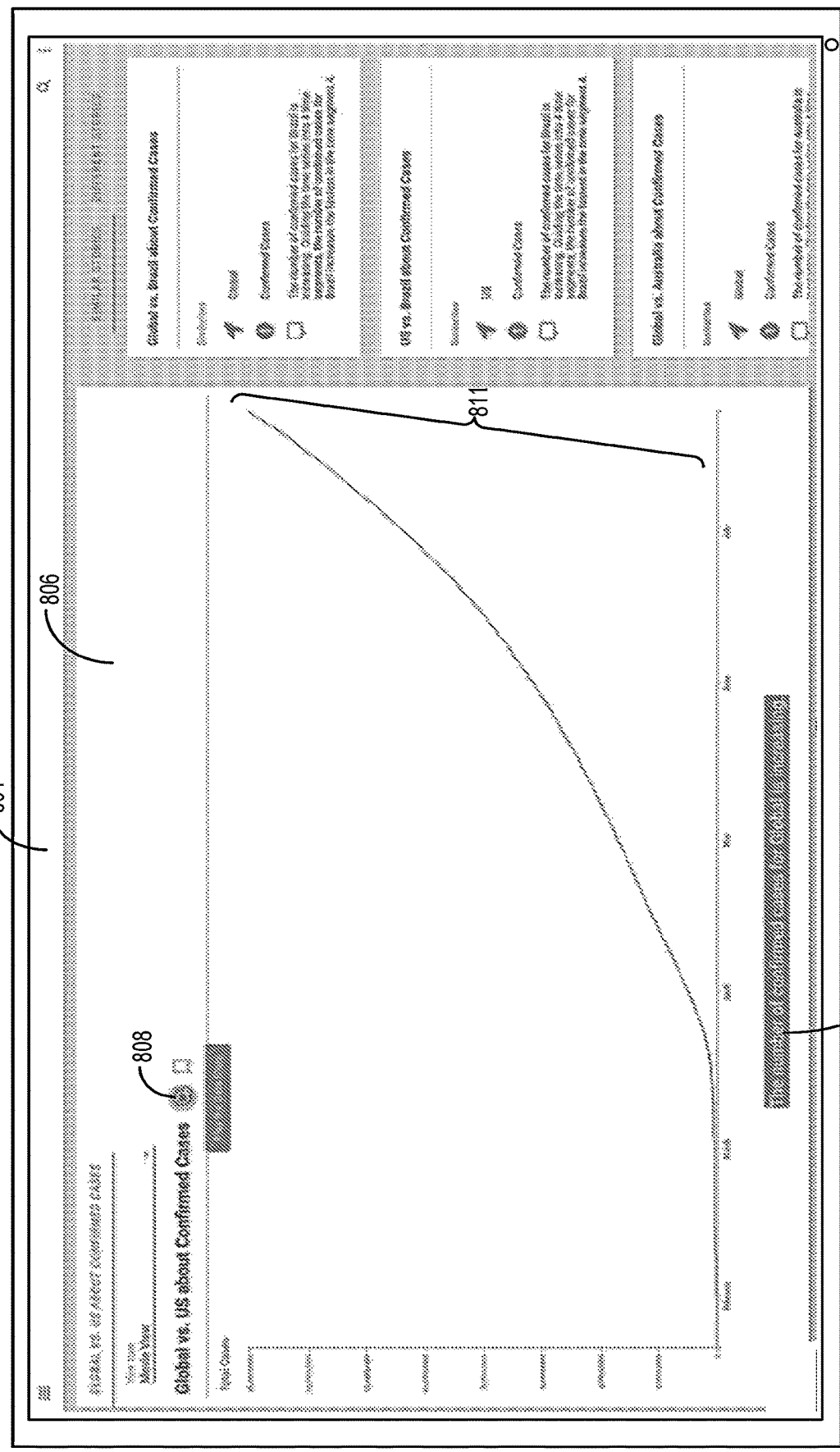
FIGS. 8A-8E illustrate graphical user interfaces for visual data stories in accordance with one or more embodiments.

Indeed, FIG. 8A illustrates the visual-data-story system 106 providing, for display within a graphical user interface 804 of a client device 802, a visual data story 806. As further illustrated in FIG. 8A, within a movie view, the visual-data-story system 106 provides, for display within the graphical user interface 804, the visual data story 806 as an animated video that plays upon detecting a user interaction with the selectable option 808. Based on detecting a selection of the selectable option 808, the client device 802 displays a video depicting changing data as part of a time series as the first graphical visualization 811 changes over time. Indeed, in one or more embodiments, the visual-data-story system 106 provides, for display within the graphical user interface 804, a video of the visual data story 806 with a first graphical visualization 811 and a first natural language summary 812. In some instances, the visual-data-story system 106 also generates an audio output of the first natural language summary 812 from the client device 802.

Figure 8B:
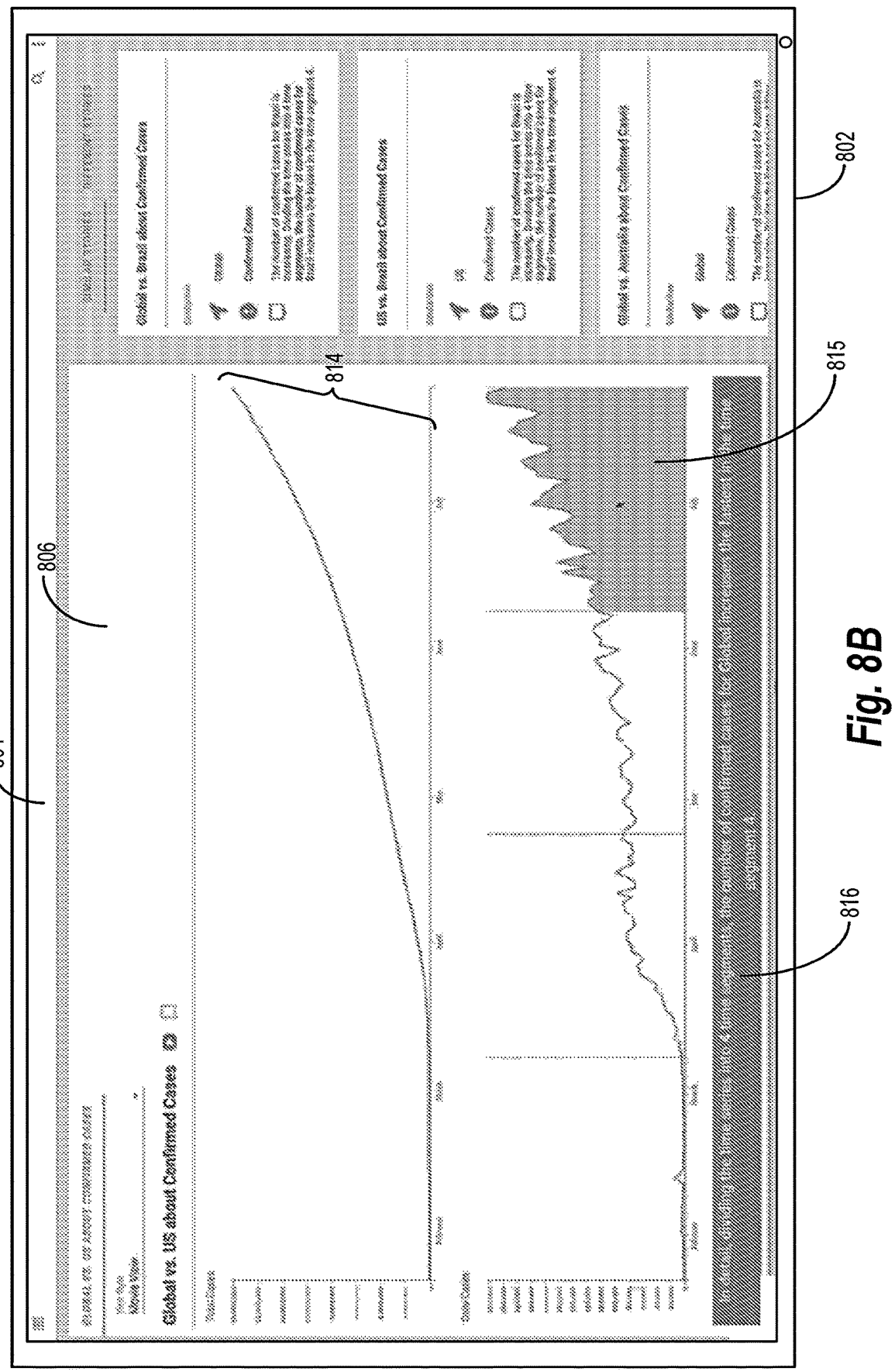

As illustrated in FIG. 8B and as a progression of the video of the visual data story 806 from the illustration of FIG. 8A, the visual-data-story system 106 displays, within the graphical user interface 804 of the client device 802, a second graphical visualization 814 (e.g., displaying both Global Total Cases and Global Daily Cases) and a second natural language summary 816 as part of the visual data story 806. In certain instances, the visual-data-story system 106 also generates an audio output of the second natural language summary 816 from the client device 802.

As further shown in FIG. 8B, the visual-data-story system 106 provides, for display within the graphical user interface 804, a highlighted portion 815 associated with a segment (e.g., a time segment) of the visual data story 806. Indeed, as illustrated in FIG. 8B, the visual-data-story system 106 includes the highlighted portion 815 within second graphical visualization 814 to indicate (or emphasize) a specific data insight corresponding to the segment (e.g., the time segment) from the visual data story 806. As shown in FIG. 8B, the visual-data-story system 106 utilizes the highlighted portion 815 to indicate the data insight within the second natural language summary 816 (e.g., within a time segment 4).

Figure 8C:
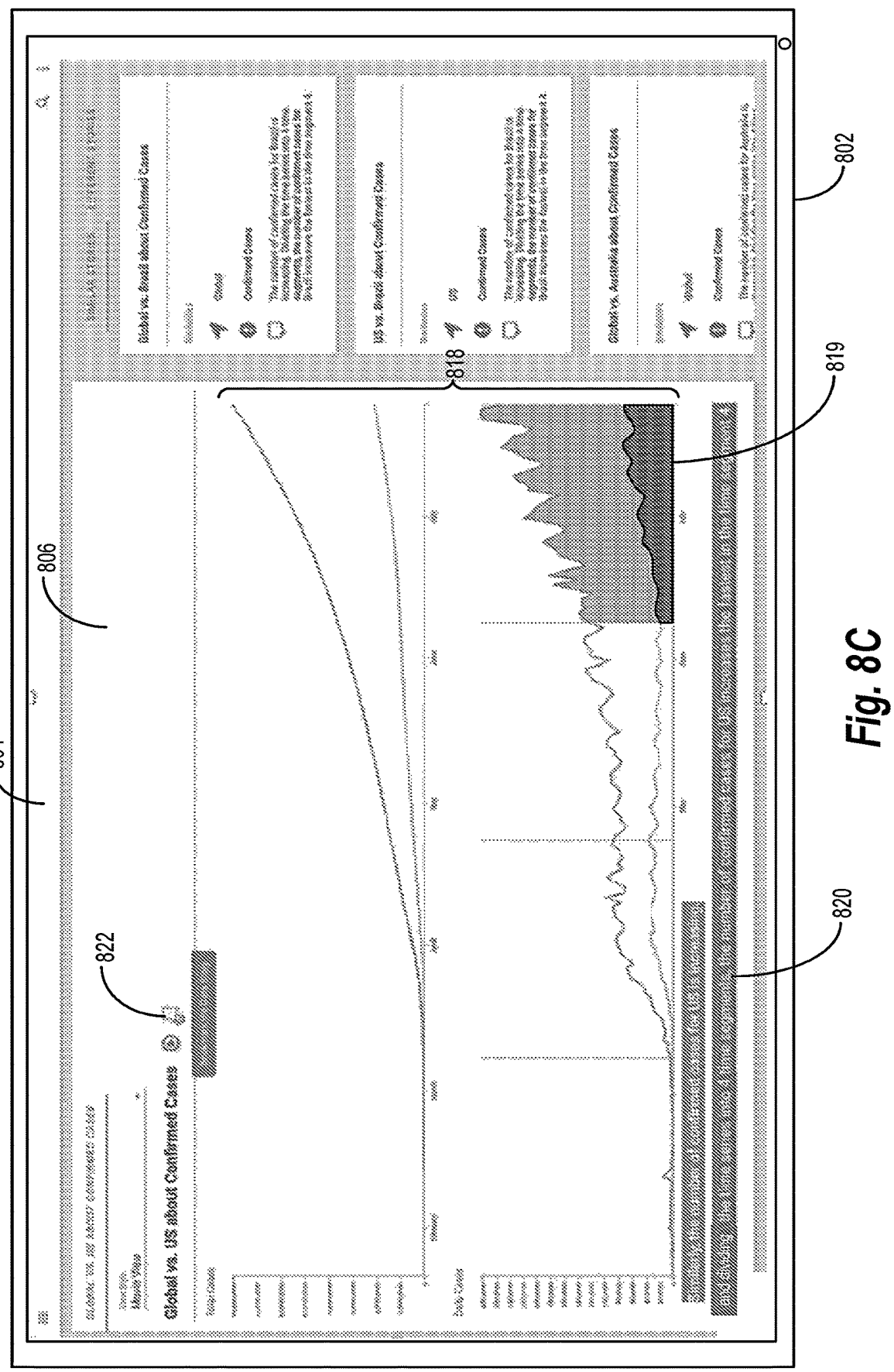

As a further progression of the video of the visual data story 806 from the illustration of FIG. 8B, FIG. 8C illustrates the visual-data-story system 106 displaying, within the graphical user interface 804 of the client device 802, a third graphical visualization 818 and a third natural language summary 820 as part of the visual data story 806. In some instances, the visual-data-story system 106 also generates an audio output of the third natural language summary 820. Indeed, as shown in FIG. 8C, the visual-data-story system 106 displays charts for U.S. Total Cases and U.S. Daily Cases in comparison to the Total and Daily Cases for Global within the third graphical visualization 818. As indicated by the progression of the visual data story 806 shown in FIGS. 8A-8C, in some cases, the first natural language summary 812, the second natural language summary 816, and the third natural language summary 820 each comprise a segment of a larger natural language summary.

As further shown in FIG. 8C, the visual-data-story system 106 also displays a highlighted portion 819 within the third graphical visualization 818 to indicate (or emphasize) a specific data insight corresponding to the segment (e.g., the time segment) from the visual data story 806. Indeed, as shown in FIG. 8C, the visual-data-story system 106 utilizes the highlighted portion 819 to indicate the data insight within the third natural language summary 820 (e.g., within a time segment 4).

In addition to various components of the visual data story 806, as illustrated in FIG. 8C, the visual-data-story system 106 provides, for display, a selectable option 822 to bookmark (or select) the visual data story 806. For example, in one or more embodiments, the visual-data-story system 106 receives a user interaction with the selectable option 822 and adds the visual data story 806 within the bookmarked-visual-data stories. Indeed, the visual-data-story system 106 sometimes utilizes the visual data stories that are selected with the selectable option 822 (e.g., the bookmarked-visual-data stories) to generate a stitched-visual-data story (as described above).

Figure 8D:
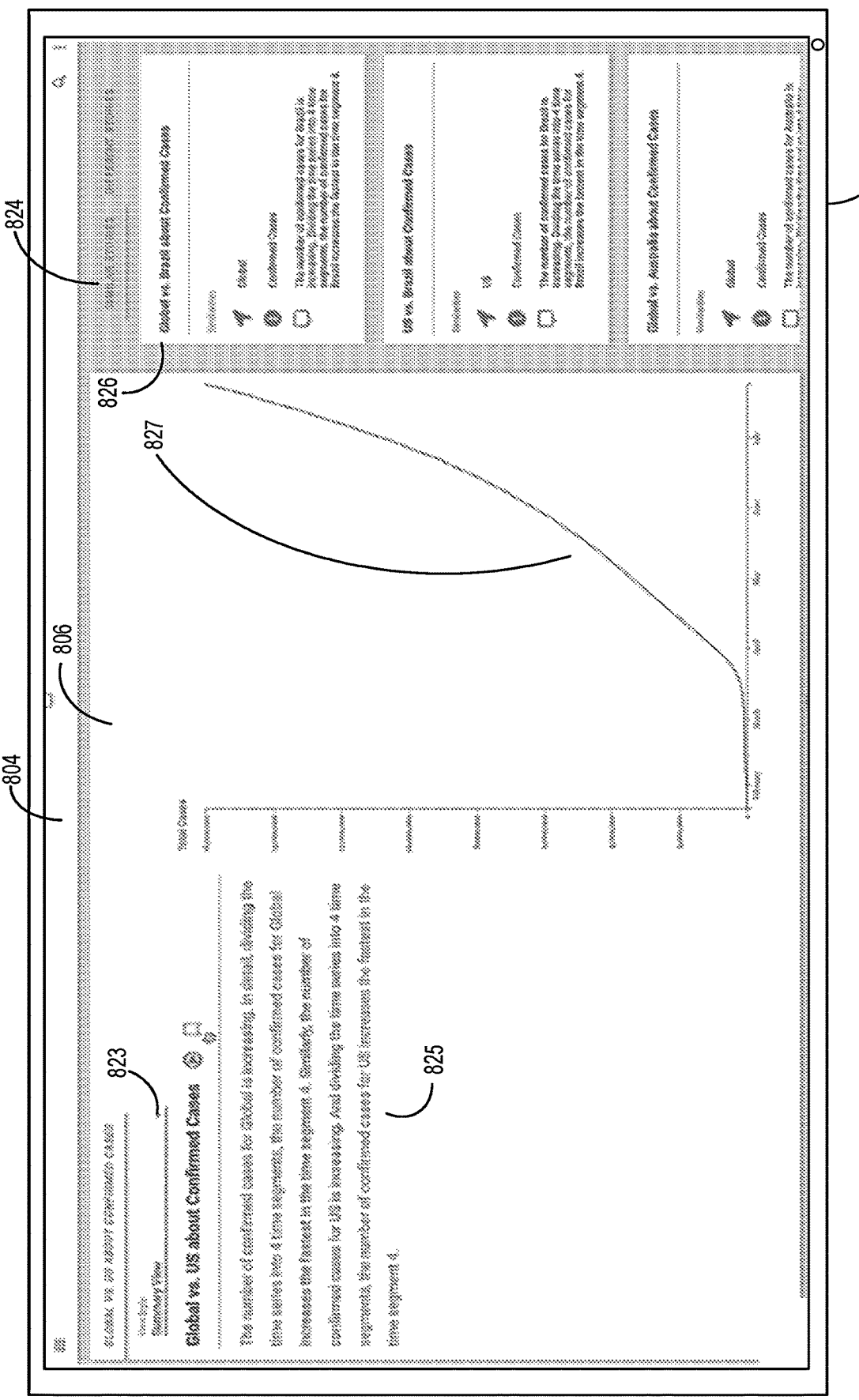

In some instances, the visual-data-story system 106 also provides, for display within a graphical user interface, a summary view of a visual data story. For instance, FIG. 8D illustrates the visual-data-story system 106 providing, for display within the graphical user interface 804 of the client device 802, a summary view of the visual data story 806 (e.g., by interacting with the "view style" dropdown menu 823). In the summary view, the visual-data-story system 106 provides a text description 825 (e.g., the complete natural language summary corresponding to the visual data story) on one portion of the graphical user interface 804 while displaying a graphical visualization 827 corresponding to data insights on another portion of the graphical user interface 804. In some cases, upon detecting an interaction (e.g., a cursor hover and click) over a portion of the natural language summary in the text description 825, the visual-data-story system 106 provides, for display within the graphical user interface 804, an accompanying visualization of the selected data insight within the visual data story 806 (or the graphical visualization 827).

As indicated above, in some embodiments, the visual-data-story system 106 provides, for display within a graphical user interface, a variety of similar and/or dissimilar visual data stories as recommendations from a visual-data-story graph. For example, as shown in FIG. 8D, the visual-data-story system 106 also provides, for display within the graphical user interface 804, a recommended visual data stories panel 824. As also shown in FIG. 8D, the visual-data-story system 106 provides, for display within the graphical user interface 804, both similar and dissimilar (e.g., different) visual data stories within the recommended visual data stories panel 824 that are selected using the visual data story 806 within a visual-data-story graph (in accordance with one or more embodiments). Indeed, as illustrated in FIG. 8D, the visual-data-story system 106 also provides, for display within the graphical user interface 804, selectable option 826 to select visual data stories (e.g., for a similar and/or different visual data story) from the recommended visual data stories panel 824.

Figure 8E:
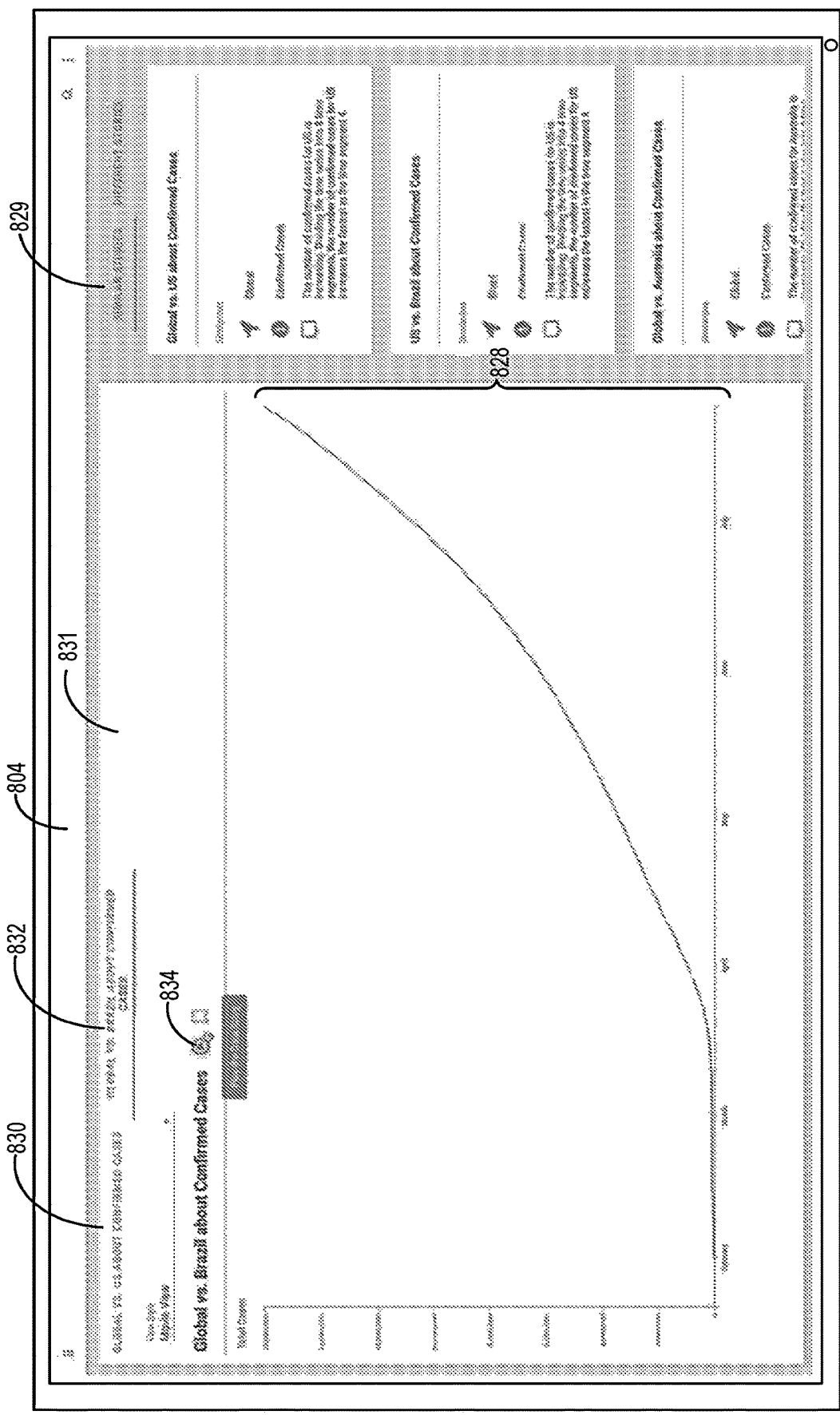

Upon receiving a user interaction with the selectable option 826 (e.g., as a thumbnail for the Global vs. Brazil data story), the visual-data-story system 106 changes from display of the visual data story 806 to the content corresponding to a visual data story corresponding to the selectable option 826. For example, based on receiving a user interaction with the selectable option 826, the visual-data-story system 106 displays, within the graphical user interface 804 of the client device 802, a visual data story 831 (as illustrated in FIG. 8E). As shown in FIG. 8E, the visual-data-story system 106 displays, within the graphical user interface 804, a graphical visualization 828 as part of the visual data story 831 (e.g., Global vs. Brazil visual data story). Moreover, as shown in FIG. 8E, the visual-data-story system 106 also displays, within the graphical user interface 804, a selectable option 834 to play the visual data story 831 as an animated video (e.g., as described above). Indeed, upon detecting a selection of the selectable option 834, visual-data-story system 106 displays a video depicting changing data as part of a time series as the visual data story 831 changes over time (with natural language summaries, audio output of the natural language summaries, and/or highlighted insights).

As also shown in FIG. 8E, the visual-data-story system 106 an alternative collection of similar or dissimilar visual data stories for display within the recommended visual data stories panel 829 based on relationships in a visual-data-story graph. Although FIG. 8E illustrates similar visual data stories in the recommended visual data stories panel 829, in one or more embodiments, the visual-data-story system 106 provides, for display within the graphical user interface 804, different visual data stories (as determined using a visual-data-story graph) and selectable options to select the different visual data stories. As also shown in FIG. 8E, the visual-data-story system 106 provides, for display within the graphical user interface 804, a selectable option 830 (e.g., selectable tab) to navigate to visual data story 806 from FIGS. 8A-8D and a selectable option 832 (e.g., selectable tab) to navigate to the visual data story 831.

Although not shown in FIGS. 8A-8E, in one or more embodiments, the visual-data-story system 106 also provides, for display within a graphical user interface, a visual-data-story-home panel that includes one or more recommended visual data stories from a visual-data-story graph (as also mentioned in FIG. 5). In particular, in one or more embodiments, the visual-data-story system 106 provides, for display within a graphical user interface, one or more auto recommended visual data stories as a starting point (for a user browsing visual data stories in response to uploading an input dataset). In some cases, the visual-data-story system 106 utilizes an interest level corresponding to a visual data story to auto recommend the visual data story (e.g., based on previous views, feedback, level of generality used in visual data story). In certain instances, the visual-data-story system 106 utilizes a machine learning model to determine the interest levels (or rank) the visual data stories to recommend the visual data stories.

Moreover, in one or more embodiments, the visual-data-story system 106 receives user interactions from a client device to edit or modify a visual data story. For example, the visual-data-story system 106 receives user interactions to modify graphical visualizations and/or natural language summaries within a graphical user interface that displays a visual data story. Upon receiving user interactions to modify one or more graphical visualizations and/or the natural language summaries, the visual-data-story system 106 modifies the one or more graphical visualizations and/or the natural language summaries. For example, the visual-data-story system 106 modifies one or more graphical visualizations and/or the natural language summaries by modifying colors, modifying chart styles, modifying text, and/or modifying titles. In some instances, the visual-data-story system 106 also adds and/or removes data insights (or visual data stories) from the graphical user interface by interacting (e.g., a double click) with the visual data story or natural language summary.

In addition, in some embodiments, the visual-data-story system 106 provides, for display within a graphical user interface, a search bar (e.g., for text input) to search through visual data stories. For instance, the visual-data-story system 106 receives a keyword search through the search bar and utilizes the keywords to search for relevant visual data stories from a visual-data-story graph. As an example, the visual-data-story system 106 searches for the keywords provided via the search bar in the content and/or visual-data story properties of the visual data stories in visual-data-story graph. Upon identifying one or more visual data stories based on the keyword search, the visual-data-story system 106, provides, for display within a graphical user interface, the one or more visual data stories. In one or more embodiments, the visual-data-story system 106 provides, for display within a graphical user interface, a visual data story (e.g., in accordance with FIG. 8) upon receiving a selection of the visual data story from the search result visual data stories.

As mentioned above, the visual-data-story system 106 provides, for display, graphical user interfaces that increase the efficiency and ease of quickly reviewing and selecting visual data stories to generate exportable files for one or more visual data stories. In some embodiments, the visual-data-story system 106 also provides such functionality on client devices that have small and/or limited screen space. Indeed, in one or more embodiments, the visual-data-story system 106 utilizes a computationally-guided process of automatically generating presentable and coherent visual data stories that indicate in-depth data insights directly from raw input data with less navigational steps and less specialized skills in data analysis on mobile devices with limited screen space.

Figure 9:
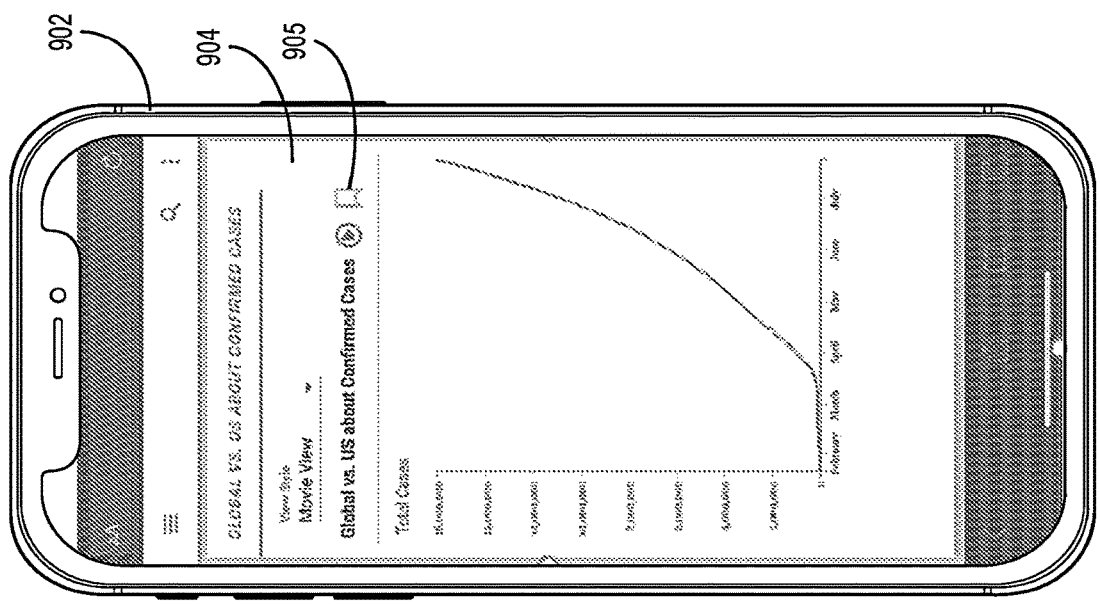

For example, FIG. 9 illustrates the visual-data-story system 106 providing, for display within a graphical user interface of a mobile client device 902, a visual data story 904 (e.g., as an animated video, with a text- and/or audio-based natural language summary, an image) in accordance with one or more embodiments. Furthermore, as shown in FIG. 9, the visual-data-story system 106 also provides, for display within the graphical user interface of the mobile client device 902, a selectable option 905 to select (or bookmark) a visual data story to generate a stitched-visual-data story. In some embodiments and in reference to FIG. 9, the visual-data-story system 106 provides, for display within the graphical user interface of the mobile client device 902, the visual data story 904 in response to receiving an input dataset from the mobile client device 902.

Figure 10:
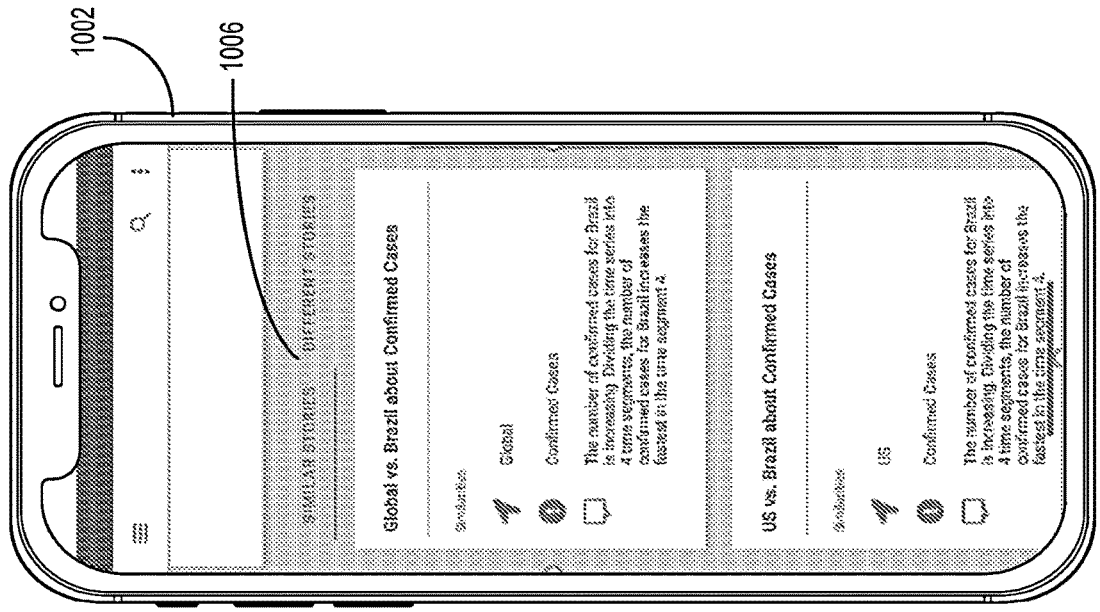
FIGS. 9 and 10 illustrate graphical user interfaces for a visual data story on a mobile client device in accordance with one or more embodiments.

Additionally, FIG. 10 illustrates the visual-data-story system 106 providing, for display within the mobile client device 1002, a recommended visual data stories panel 1006 that provides similar and different visual data stories from a visual-data-story graph in relation to a selected visual data story. Indeed, as shown in FIG. 10, the visual-data-story system 106 enables browsing and selective capabilities of the visual data stories on the mobile client device 1002 to generate an exportable, stitched-visual-data story (e.g., in accordance with one or more embodiments) directly from the limited screen space of the mobile client device 1002.

As mentioned above, the visual-data-story system 106 provides an efficient and quick computationally-guided process of automatically generating presentable and coherent visual data stories directly from raw input data. To test and demonstrate the efficiency and user-friendly functions of the visual-data-story system 106, researchers set up participants to utilize the visual-data-story system 106 to generate visual data stories from a dataset and requested the participants to take a post-study questionnaire that included Likert-scale rating questions and NASA TLX questions for measuring the difficulty of completing tasks within the visual-data-story system 106. The researchers utilized the Likert-scale rating questions to determine whether participants found (1) the visual-data-story system 106 was easy to learn and intuitive to use, (2) the summary view, movie view, the bookmark, and recommendations of visual data stories were helpful in the participants' story-making process, and (3) whether the composition and text of the visual data stories and/or a stitched-visual-data story from determined data insights were sensible. The Likert-scale rating questions resulted in median ratings that were above 6 (e.g., strong agreement on the Likert-scale rating questions).

In addition, the researchers utilized the National Aeronautics and Space Administration Task Load Index (NASA TLX) questions to determine the overall effort required by participants to utilize the computationally-guided process of automatically generating generated by the visual-data-story system 106. The Likert-scale ratings further resulted in a median ratings that were below 2 for the NASA TLX questions (e.g., an indication that participants required a low effort to utilize the computationally-guided process of automatically generating generated by the visual-data-story system 106).

Figure 11:
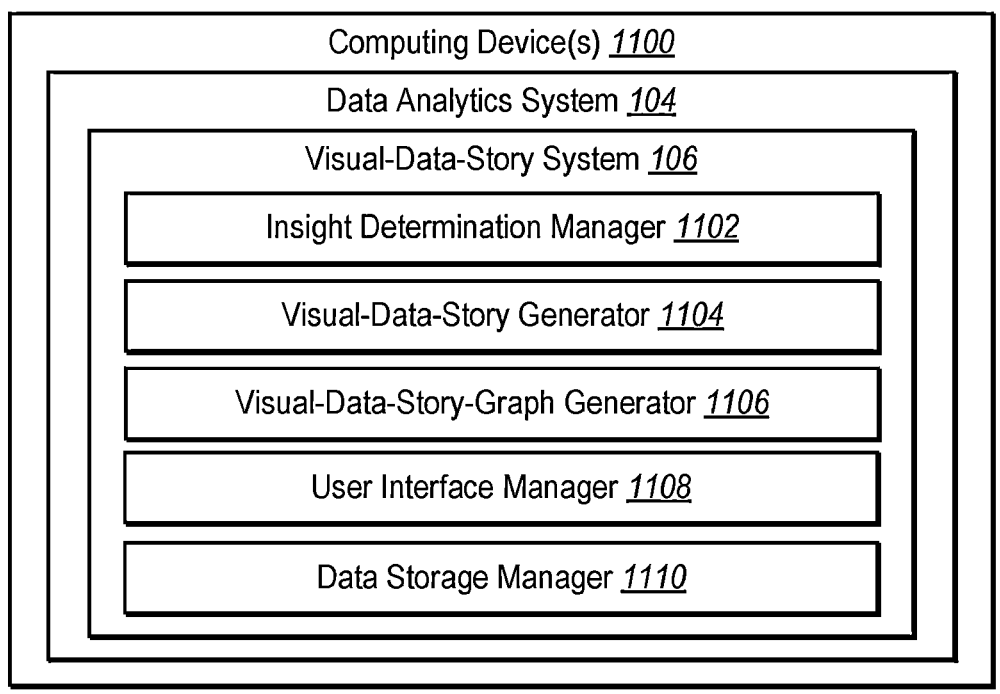
FIG. 11 illustrates a schematic diagram of a visual-data-story system in accordance with one or more embodiments.

Turning now to FIG. 11, additional detail will be provided regarding components and capabilities of one or more embodiments of the visual-data-story system. In particular, FIG. 11 illustrates an example visual-data-story system 106 executed by a computing device 1100 (e.g., the server device(s) 102 or the client device 110). As shown by the embodiment of FIG. 11, the computing device 1100 includes or hosts the data analytics system 104 and the visual-datastory system 106. Furthermore, as shown in FIG. 11, the visual-data-story system 106 includes an insight determination manager 1102, a visual-data-story generator 1104, a visual-data-story-graph generator 1106, a user interface manager 1108, and a data storage manager 1110.

As just mentioned, and as illustrated in the embodiment of FIG. 11, the visual-data-story system 106 includes the insight determination manager 1102. For example, the insight determination manager 1102 determines data insights from an input dataset as described above (e.g., in relation to FIGS. 2-4). In some embodiments, the insight determination manager 1102 determines data insights such as derived data values, energy ratios, linear data trends, data value extremums/minimums, and/or data distributions from dataset groups of a dataset as described above (e.g., in relation to FIGS. 2-4).

Moreover, as shown in FIG. 11, the visual-data-story system 106 includes the visual-data-story generator 1104. For instance, the visual-data-story generator 1104 utilizes determined data insights to generate graphical representations (e.g., image and/or video) and/or text- and/or audio-based natural language summaries from the data insights as described above (e.g., in relation to FIGS. 2, 3, and 4). Furthermore, in some embodiments, the visual-data-story generator 1104 utilizes a data story template to generate a visual data story as described above (e.g., in relation to FIG. 4). Additionally, in one or more embodiments, the visual-data-story system 106 generates a stitched-visual-data story from bookmarked-visual-data stories selected by users as described above (e.g., in relation to FIG. 6).

As illustrated in FIG. 11, the visual-data-story system 106 also includes the visual-data-story-graph generator 1106. In one or more embodiments, the visual-data-story-graph generator 1106 determines pairwise similarity distances between pairs of visual data stories as described above (e.g., in relation to FIGS. 2 and 5). In some instances, the visual-data-story-graph generator 1106 determines data-attribute distances, group-name distances, group-attribute distances, and/or group-insight distances to generate a visual-data-story graph as described above (e.g., in relation to FIG. 5). For example, the visual-data-story-graph generator 1106 generates a visual-data-story graph having visual data stories as nodes and having edges that connect the nodes to indicate similarity distances (or similarity scores) between the nodes as described above (e.g., in relation to FIG. 5).

Furthermore, as shown in FIG. 11, the visual-data-story system 106 also includes the user interface manager 1108. In one or more embodiments, the user interface manager 1108 provides, for display within a graphical user interface, a visual data story and selectable options to interact with the visual data story (e.g., bookmarking, stitching, playing videos, playing audio, selecting data insights) as described above (e.g., in relation to FIGS. 2, 3, 6, and 8-10). Moreover, in certain instances, the user interface manager 1108 provides, for display within a graphical user interface, recommended visual data stories (e.g., similar and/or different visual data stories) that are selected from a visual-data-story graph as described above (e.g., in relation to FIGS. 8 and 10).

In addition, as shown in FIG. 11, the visual-data-story system 106 includes the data storage manager 1110. In one or more embodiments, the data storage manager 1110 is implemented by one or more memory devices. Moreover, in some embodiments, the data storage manager 1110 maintains data to perform one or more functions of the visual-data-story system 106. For example, the data storage manager 1110 includes datasets (e.g., input datasets from client devices), data insight information (e.g., determined data insights, dataset groups), visual data story components (e.g., visual data stories, data story templates, audio files, video files, bookmarked-visual-data stories), and/or visual-data-story graph information (e.g., nodes, edges, similarity distances, similarity scores).

Each of the components 1102-1110 of the computing device 1100 (e.g., the computing device 1100 implementing the visual-data-story system 106), as shown in FIG. 11, may be in communication with one another using any suitable technology. The components 1102-1110 of the computing device 1100 can comprise software, hardware, or both. For example, the components 1102-1110 can comprise one or more instructions stored on a computer-readable storage medium and executable by processor of one or more computing devices. When executed by the one or more processors, the computer-executable instructions of the visual-data-story system 106 (e.g., via the computing device 1100) can cause a client device and/or server device to perform the methods described herein. Alternatively, the components 1102-1110 and their corresponding elements can comprise hardware, such as a special purpose processing device to perform a certain function or group of functions. Additionally, the components 1102-1110 can comprise a combination of computer-executable instructions and hardware.

Furthermore, the components 1102-1110 of the visual-data-story system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1110 may be implemented as a stand-alone application, such as a desktop or mobile application. Furthermore, the components 1102-1110 may be implemented as one or more web-based applications hosted on a remote server. The components 1102-1110 may also be implemented in a suite of mobile device applications or "apps." To illustrate, the components 1102-1110 may be implemented in an application, including but not limited to, ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE," "ADOBE ANALYTICS CLOUD," "ADOBE ANALYTICS," "ADOBE AUDIENCE MANAGER," "ADOBE CAMPAIGN," "ADOBE EXPERIENCE MANAGER," and "ADOBE TARGET" are either registered trademarks or trademarks of Adobe Inc. in the United States and/or other countries.

Figure 12:
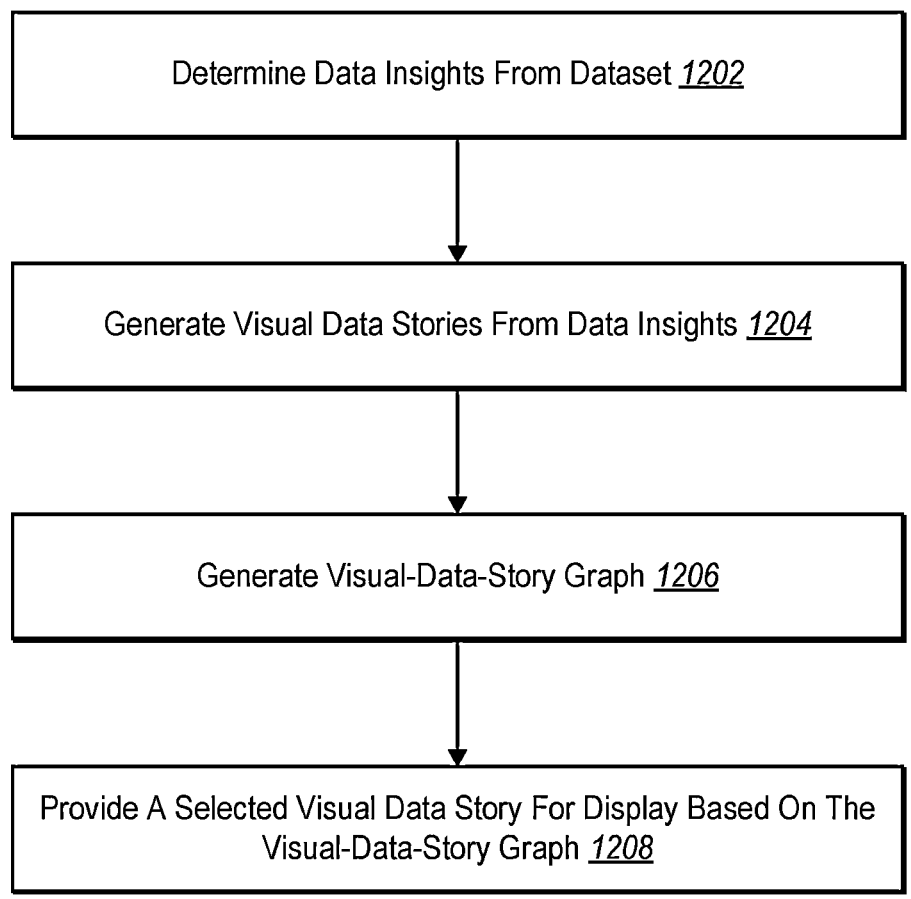
FIG. 12 illustrates a flowchart of a series of acts for generating a visual data story in accordance with one or more embodiments.

FIGS. 1-11, the corresponding text, and the examples provide a number of different methods, systems, devices, and non-transitory computer-readable media of the visual-data-story system 106. In addition to the foregoing, one or more embodiments can also be described in terms of flowcharts comprising acts for accomplishing a particular result, as shown in FIG. 12. The acts shown in FIG. 12 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 12. In some embodiments, a system can be configured to perform the acts of FIG. 12. Alternatively, the acts of FIG. 12 can be performed as part of a computer-implemented method.

As mentioned above, FIG. 12 illustrates a flowchart of a series of acts 1200 for generating a visual data story from a dataset in accordance with one or more embodiments. While FIG. 12 illustrates acts according to one embodiment, alternative embodiments may omit, add to, reorder, and/or modify any of the acts shown in FIG. 12.

As shown in FIG. 12, the series of acts 1200 include an act 1202 of determining data insights from a dataset. In particular, in one or more embodiments, the act 1202 includes receiving, from a client device, a dataset organized according to data-attribute categories including dataset groups. For example, a dataset includes tabular data recorded over a time period and organized according to data-attribute categories including dataset groups and one or more additional data-attribute values that correspond to the dataset groups. Furthermore, in one or more embodiments, the act 1202 includes determining data insights across different dataset groups utilizing a statistical analysis that compares data-attribute values corresponding to the dataset groups. In one or more embodiments, the act 1202 includes determining data insights from a comparison of data-attribute values corresponding to dataset groups.

For example, the act 1202 includes determining data insights by determining energy ratios from portions of particular data-attribute values organized in a time series for a particular dataset group or determining a linear data trend for the time series utilizing a linear regression on the time series for the particular dataset group. Furthermore, in some embodiments, the act 1202 includes determining data insights by determining a first data trend between a first dataset group and a second dataset group and a second data trend between the first dataset group and a third dataset group. In addition, in certain instances, the act 1202 includes determining that a first data trend and a second data trend follow a similar pattern. In certain instances, the act 1202 includes determining data insights across different dataset groups by determining an increasing data trend between a first dataset group and a second dataset group and a decreasing data trend between the first dataset group and a third dataset group. In one or more embodiments, the act 1202 includes determining data insights by comparing data-attribute values corresponding to dataset groups to determine one or more of derived data values, data distributions, data extremums, or data minimums from the data-attribute values corresponding to the dataset groups. Moreover, in some instances, the act 1202 includes determining a linear data trend for a time series utilizing a linear-least-squares regression on the time series for a particular dataset group.

As shown in FIG. 12, the series of acts 1200 include an act 1204 of generating a visual data stories from data insights. In particular, in some embodiments, the act 1204 includes generating visual data stories by generating graphical visualizations and natural language summaries of data insights determined from a comparison of data-attribute values corresponding to dataset groups. In some instances, the act 1204 includes, based on determined data insights, generating visual data stories comparing particular dataset groups by generating graphical visualizations and natural language summaries of particular data insights across the particular dataset groups. In certain instances, the act 1204 includes generating visual data stories comparing particular dataset groups by generating a first visual data story comprising a first graph and a first natural language summary of an increasing data trend between a first dataset group and a second dataset group and generating a second visual data story comprising a second graph and a second natural language summary of a decreasing data trend between the first dataset group and a third dataset group.

As shown in FIG. 12, the series of acts 1200 include an act 1206 of generating a visual-data-story graph. In particular, in some embodiments, the act 1206 includes generating a visual-data-story graph comprising nodes for visual data stories and edges representing similarity distances between data-story properties of visual-data-story pairs from the visual data stories. Furthermore, in some embodiments, the act 1206 includes determining similarity distances between data-story properties of the visual-data-story pairs from the visual data stories that compare particular dataset groups by determining data-attribute distances between particular data-attribute values for the particular dataset groups in pairs of visual data stories, determining grouping-attribute distances between particular data-attribute categories for the particular dataset groups in the pairs of visual data stories, determining group-name distances among group names for the particular dataset groups in the pairs of visual data stories, and/or determining group-insight distances between particular data insights for the particular dataset groups in the pairs of visual data stories. In some cases, the act 1206 includes determining similarity distances between data-story properties of visual-data-story pairs from visual data stories as an aggregate pairwise distance by combining data-attribute distances, grouping-attribute distances, group-name distances, the group-insight distances. Moreover, in some embodiments, the act 1206 includes determining similarity scores between visual-data-story pairs from visual data stories based on similarity distances between data-story properties of the visual-data-story pairs.

As shown in FIG. 12, the series of acts 1200 include an act 1208 of providing a selected visual data story for display based on the visual-data-story graph. In particular, in one or more embodiments, the act 1208 includes providing, for display within a graphical user interface of a client device, a visual data story selected from among visual data stories utilizing a visual-data-story graph. In some cases, the act 1208 includes receiving, from a client device, a selection of a visual data story as a bookmarked-visual-data story, adding the visual data story to a set of bookmarked-visual-data stories, and generating a stitched-visual-data story for an exportable file utilizing a combination of the set of bookmarked-visual-data stories. Furthermore, in some embodiments, the act 1208 includes combining a set of bookmarked-visual-data stories utilizing a minimum spanning tree algorithm. In some embodiments, the act 1208 includes receiving, from a client device, a selection of the visual data story as a bookmarked-visual-data story, combining the visual data story into a set of bookmarked-visual-data stories utilizing a minimum spanning tree algorithm, and generating a stitched-visual-data story for an exportable file comprising the combined set of bookmarked-visual-data stories.

In some instances, the act 1208 includes identifying a similar visual data story to a visual data story utilizing a visual-data-story graph and providing, for display within a graphical user interface of a client device, a selectable option for the similar visual data story. In some cases, the act 1208 includes providing, for display within a graphical user interface of a client device, a visual data story selected from generated visual data stories and a selectable option for a similar visual-data story utilizing a visual-data-story graph. Additionally, in one or more embodiments, the act 1208 includes providing, for display within a graphical user interface of a client device, a visual data story selected from among visual data stories based on similarity distances represented within a visual-data-story graph. In addition, in some embodiments, the act 1208 includes identifying one or more similar visual data stories from a visual-data-story graph based on particular similarity scores between a selected visual data story and other visual data stories within the visual-data-story graph, and providing, for display within a graphical user interface of a client device, the visual data story and one or more selectable options for the one or more similar visual data stories. Furthermore, in some embodiments, the act 1208 includes identifying a dissimilar visual data story from a selected visual data story utilizing a visual-data-story graph and providing, for display within a graphical user interface of a client device, a selectable option for the dissimilar visual data story.

Furthermore, in one or more embodiments, the act 1208 includes, based on determining a similar pattern between a first data trend and a second data trend, provide, for display within a graphical user interface of a client device, a visual data story to visually indicate the similar pattern between the first data trend and the second data trend. In some instances, the act 1208 includes providing a visual data story as a video file. Moreover, in one or more embodiments, the act 1208 includes providing, for display within a graphical user interface of a client device, a visual data story having a highlighted portion associated with a time segment of the visual data story. For example, a highlighted portion indicates a specific data insight corresponding to a time segment. Furthermore, in some embodiments, the act 1208 includes generating, utilizing natural language processing, an audio file comprising a natural language summary of particular data insights for a visual data story selected from among visual data stories.

In addition (or in alternative) to the acts above, the visual-data-story system 106 can also perform a step for constructing a visual-data-story graph that indicates relationships between generated visual data stories. For instance, the acts and algorithms described above in relation to FIG. 5 (e.g., the acts 502-512) comprise the corresponding acts and algorithms for performing a step for constructing a visual-data-story graph that indicates relationships between generated visual data stories.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
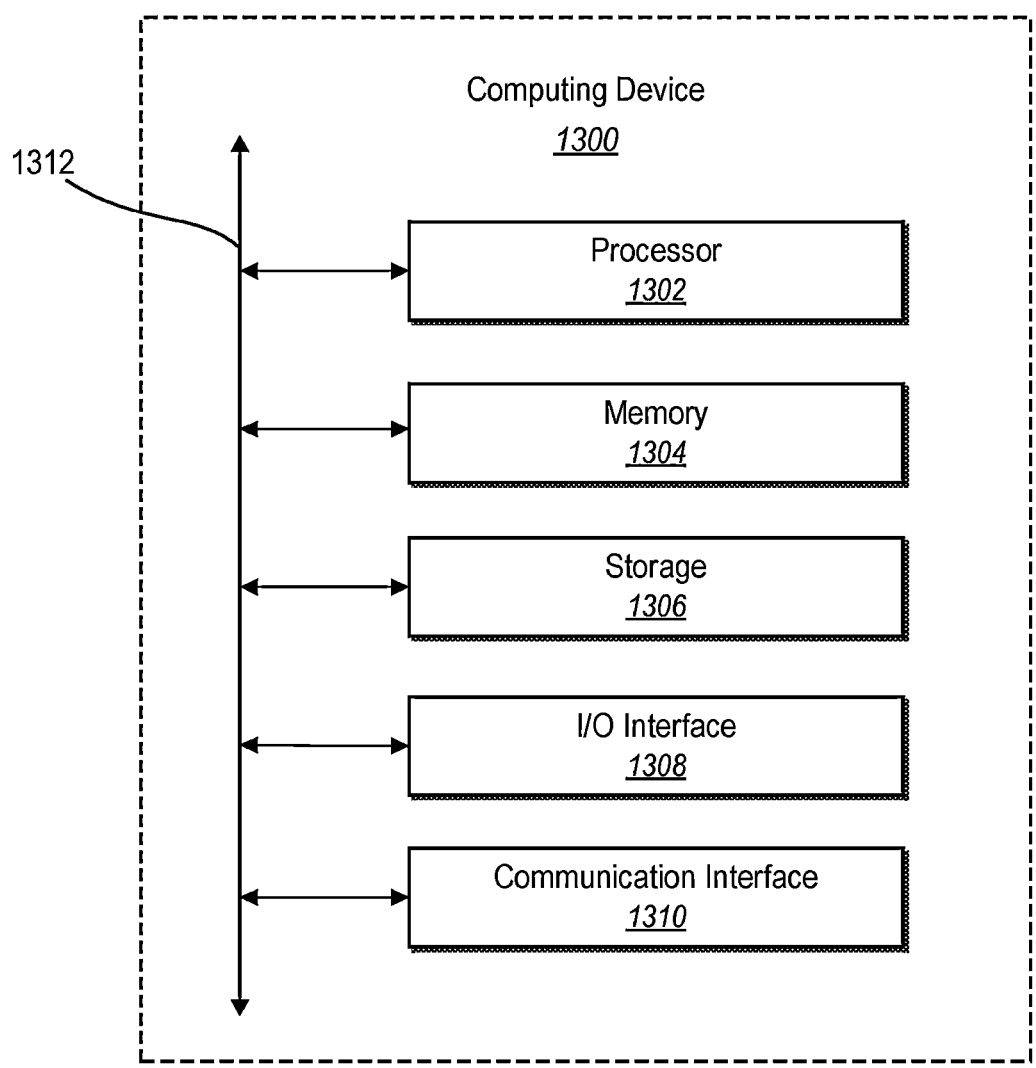
FIG. 13 illustrates a block diagram of an example computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., computing device 1100, server device(s) 102, and client device 110). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments.

Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive ("HDD"), flash memory, a Universal Serial Bus ("U.S.B") drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
   determining data insights across different dataset groups of a dataset utilizing a statistical analysis that compares data-attribute values corresponding to the dataset groups;
   generating visual data stories comprising graphical visualizations and natural language summaries of the data insights;
   determining aggregate pairwise distances between data-story properties of visual-data-story pairs from the visual data stories by combining data-attribute distances, grouping-attribute distances, group-name distances, and group-insight distances between the visual-data-story pairs; and
   generating a stitched-visual-data story from a combination of visual data stories selected based on the aggregate pairwise distances.

2. The non-transitory computer-readable medium of claim 1, wherein the operations further comprise determining the data insights by determining a first data trend between a first dataset group and a second dataset group and a second data trend between the first dataset group and a third dataset group.

3. The non-transitory computer-readable medium of claim 2, wherein the operations further comprise determining the data insights by determining that the first data trend and the second data trend follow a similar pattern or a dissimilar pattern.

4. The non-transitory computer-readable medium of claim 1, wherein the operations further comprise generating the stitched-visual-data story as an exportable video file.

5. The non-transitory computer-readable medium of claim 1, wherein the operations further comprise exporting the stitched-visual-data story to a website.

6. The non-transitory computer-readable medium of claim 1, wherein the operations further comprise:
   providing, for display within a first graphical user interface of a client device, the stitched-visual-data story; and
   providing, for display within a second graphical user interface of the client device, one or more recommended visual data stories based on interest levels of a user of the client device with the recommended visual data stories.

7. The non-transitory computer-readable medium of claim 1, wherein the operations further comprise providing, for display within a graphical user interface of a client device, the stitched-visual-data story as an animated video depicting changing data over time and audio data for a natural language summary of the stitched-visual-data story.

8. The non-transitory computer-readable medium of claim 1, wherein the operations further comprise providing, for display within a graphical user interface of a client device, the stitched-visual-data story comprising a highlighted portion associated with a time segment of a visual data story indicating a specific data insight corresponding to a particular portion of a natural language summary.

9. The non-transitory computer-readable medium of claim 1, wherein the operations further comprise:
   generating a visual-data-story graph comprising nodes for the visual data stories and edges representing the aggregate pairwise distances between the data-story properties of the visual-data-story pairs; and
   generating the stitched-visual-data story by combining the combination of visual data stories utilizing a minimum spanning tree algorithm with the visual-data-story graph.

10. A system comprising:
    a memory component comprising data insights across different dataset groups of tabular data; and
    a processing device coupled to the memory component, the processing device to perform operations comprising:
       generating visual data stories comprising graphical visualizations and natural language summaries from the data insights corresponding to the different dataset groups of the tabular data;
       determining aggregate pairwise distances between data-story properties of visual-data-story pairs from the visual data stories by combining data-attribute distances, grouping-attribute distances, group-name distances, and group-insight distances between the visual-data-story pairs; and
       generating a stitched-visual-data story from a set of visual data stories selected based on the aggregate pairwise distances.

11. The system of claim 10, wherein the operations further comprise:
    determining the data-attribute distances by determining distances between particular data-attribute values for the dataset groups in the visual-data-story pairs;
    determining the grouping-attribute distances by determining distances between particular data-attribute categories for the dataset groups in the visual-data-story pairs;
    determining the group-name distances by determining distances among group names for the dataset groups in the visual-data-story pairs; or
    determining the group-insight distances by determining distances between particular data insights for the dataset groups in the visual-data-story pairs.

12. The system of claim 10, wherein the operations further comprise providing, for display within a graphical user interface of a client device, the stitched-visual-data story comprising a particular visual data story depicting a data-attribute category name, one or more dataset group insights, or data insight comparisons.

13. The system of claim 10, wherein the operations further comprise:
    receiving, from a client device, a user interaction to edit a particular visual data story within the stitched-visual-data story; and
    in response to the user interaction, modifying graphical visualizations or natural language summaries of the particular visual data story.

14. The system of claim 10, wherein the operations further comprise:
   receiving, from a client device, a keyword for a search request; and
   in response to receiving the keyword for the search request:
      identifying one or more visual data stories based on the keyword; and
      providing, for display within the client device, the one or more visual data stories.

15. The system of claim 10, wherein the operations further comprise providing, for display within a graphical user interface of a client device, the stitched-visual-data story comprising a highlighted portion associated with a time segment indicating a specific data insight corresponding to the time segment.

16. A computer-implemented method comprising:
   determining data insights across different dataset groups of a dataset utilizing a statistical analysis;
   generating visual data stories comprising graphical visualizations and natural language summaries of the data insights;
   determining aggregate pairwise distances between data-story properties of visual-data-story pairs from the visual data stories by combining data-attribute distances, grouping-attribute distances, group-name distances, and group-insight distances between the visual-data-story pairs; and
   generating a stitched-visual-data story from a combination of visual data stories selected from a visual-data-story graph based on the aggregate pairwise distances.

17. The computer-implemented method of claim 16, further comprising receiving, from a client device, a spreadsheet file as the dataset.

18. The computer-implemented method of claim 16, further comprising generating the stitched-visual-data story as an exportable video file or a portable document format (PDF) file.

19. The computer-implemented method of claim 16, further comprising providing, for display within a graphical user interface of a client device, the stitched-visual-data story as an animated video depicting changing data over time and audio data for a natural language summary of the stitched-visual-data story.

20. The computer-implemented method of claim 16, further comprising generating the visual-data-story graph to comprise nodes for the visual data stories and edges representing the aggregate pairwise distances between the data-story properties of the visual-data-story pairs.

* * * * *